(12) United States Patent
Oguchi

(10) Patent No.: US 6,907,042 B1
(45) Date of Patent: Jun. 14, 2005

(54) PACKET PROCESSING DEVICE

(75) Inventor: Naoki Oguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/552,135

(22) Filed: Apr. 19, 2000

(30) Foreign Application Priority Data

May 18, 1999 (JP) .......................................... 11-137805

(51) Int. Cl.⁷ .......................... H04L 12/28; H04L 12/56
(52) U.S. Cl. ....................... 370/412; 370/473; 370/474; 370/235; 370/230; 370/389; 370/392; 709/250; 709/236; 709/225
(58) Field of Search ................................ 370/471–474, 370/394, 235, 230, 232, 389, 412–417, 392, 401, 418, 419, 422, 428, 429, 469, 470; 709/250, 236, 238, 232, 225, 228

(56) References Cited

U.S. PATENT DOCUMENTS

| | | | | |
|---|---|---|---|---|
| 5,809,024 A | * | 9/1998 | Ferguson et al. | 370/395.53 |
| 6,026,451 A | * | 2/2000 | Sreenivas | 710/39 |
| 6,226,267 B1 | * | 5/2001 | Spinney et al. | 370/235 |
| 6,233,245 B1 | * | 5/2001 | Chapman et al. | 370/412 |
| 6,310,884 B1 | * | 10/2001 | Odenwald, Jr. | 370/412 |
| 6,453,360 B1 | * | 9/2002 | Muller et al. | 709/250 |
| 6,480,489 B1 | * | 11/2002 | Muller et al. | 370/389 |
| 6,483,804 B1 | * | 11/2002 | Muller et al. | 370/230 |
| 6,574,230 B1 | * | 6/2003 | Almulhem et al. | 370/412 |
| 6,606,301 B1 | * | 8/2003 | Muller et al. | 370/230 |
| 6,650,640 B1 | * | 11/2003 | Muller et al. | 370/392 |

* cited by examiner

Primary Examiner—Wellington Chin
Assistant Examiner—Chuong Ho
(74) Attorney, Agent, or Firm—Katten Muchin Zavis Rosenman

(57) ABSTRACT

A packet processing device in which a receiving buffer free space notifying portion notifies a free space of a receiving buffer, an accumulation condition determining portion determines a size of a big packet based on the free space, and a reassembly buffer processor reassembles a plurality of receiving packets into a single big packet to be transmitted to the receiving buffer. A backward packet inclusive information reading circuit for detecting the free space based on information within a backward packet from the upper layer may be used as the receiving buffer free space notifying portion. Also, an application layer may be used as the upper layer so that the big packet is transmitted not through a buffer of a transport layer but directly to the receiving buffer.

13 Claims, 17 Drawing Sheets

CIC : CONNECTION IDENTIFYING CIRCUIT
CCC : CHECKSUM CALCULATING CIRCUIT
HDC : HEADER DELETING CIRCUIT
RBWC : REASSEMBLY BUFFER WRITING CIRCUIT
BCDC : BUFFER CONDITION DETERMINING CIRCUIT

CIC : CONNECTION IDENTIFYING CIRCUIT
CCC : CHECKSUM CALCULATING CIRCUIT
HDC : HEADER DELETING CIRCUIT
RBWC : REASSSEMBLY BUFFER WRITING CIRCUIT
BCDC : BUFFER CONDITION DETERMINING CIRCUIT
WSEC : WINDOW SIZE EXTRACTING CIRCUIT
RBLCC : RECEIVING BUFFER LENGTH CALCULATING CIRCUIT
RBLWC : RECEIVING BUFFER LENGTH WRITING CIRCUIT

CIC : CONNECTION IDENTIFYING CIRCUIT
CCC : CHECKSUM CALCULATING CIRCUIT
HDC : HEADER DELETING CIRCUIT
RBWC : REASSSEMBLY BUFFER WRITING CIRCUIT
BCDC : BUFFER CONDITION DETERMINING CIRCUIT

FIG. 14
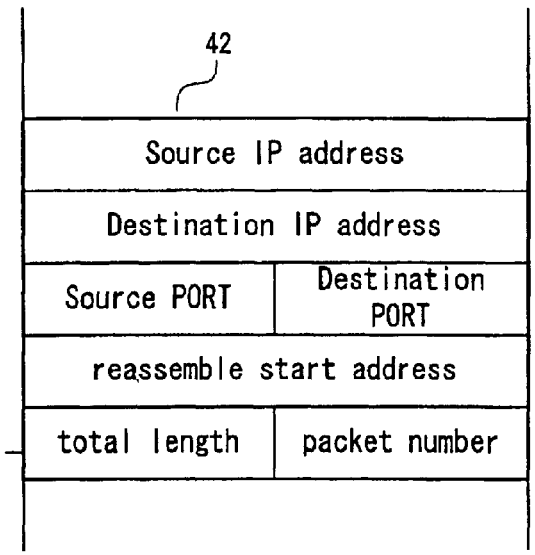
FIG. 15A
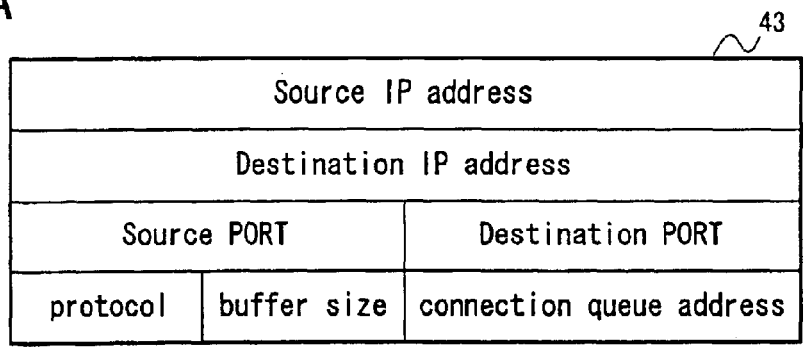
FIG. 15B
| PROTOCOL | NUMBER | REMARKS |
|---|---|---|
| icmp | 1 | internet control message protocol |
| tcp | 6 | transmission control protocol |
| egp | 8 | exterior gateway protocol |
| udp | 17 | user datagram protocol |
| rdp | 27 | "reliable datagram" protocol |

PACKET PROCESSING DEVICE

BACKGROUND OF THE INVENTION

1. Field of the Invention

The present invention relates to a packet processing device, and in particular to a packet processing device which has a layered communication protocol.

In recent years, a packet processing device which has a hierarchically structured communication protocol such as a TCP/UDP/IP has been popularized as used in a router, a layer 3 (third layer) switch (hereinafter abbreviated as "L3 switch") which performs a packet processing of a network layer on a hardware, a network interface device (Network Interface Card: hereinafter abbreviated as "NIC device") of host systems, and the like.

Also, as the communication technology in recent years has remarkably progressed, the transmission speed has become increased more and more. As a result, the packet processing device is required to follow up the speed.

2. Description of the Related Art

Having a main function of relaying packets in a network layer, the router and the L3 switch terminate the packets and pass them to an upper layer for supporting their own communications. Also, an NIC device mainly initiates and terminates the packets to realize upper layer communications. NIC devices are also able to relay the packets between plural NIC devices. The packet processing device has a function of passing packets between the layers.

Hereinafter, equipments which include such a packet processing device will be described in more detail.

The router is an equipment which is used as a packet forwarding device between networks, or subnetworks, in the Internet/Intranet. Between subnets, a packet forwarding at the third layer level in the OSI Seven Layer protocol model is generally performed. If a TCP/IP is used as the end-to-end communication protocol, the router relays an IP packet in the third layer.

Also, the router itself becomes a communication host by initiating and terminating the packets to support a remote control.

The L3 switch, as the router, is an equipment which is used as a packet forwarding device between networks, or subnetworks, in the Internet/Intranet and performs a packet forwarding at the third layer level in the OSI Seven Layer protocol model. However, unlike the router, the L3 switch realizes an IP relay processing using hardware logic.

In other words, it can be said that the L3 switch realizes packet forwarding function using hardware, which a router realizes using software.

Also, like a router, the L3 switch itself becomes a communication host by initiating and terminating the packets to support a remote control.

The NIC device is mainly used as an interface of a terminal host which is an initiation/termination point of a communication, and plays a part of a protocol processing for the application to transmit and receive the packets working with a communication application software on a communication terminal. Also, by being equiped with plural NIC devices, it is possible for a terminal host to perform a packet forwarding using a communication software.

In such devices, various ideas to efficiently pass packets received from a hardware to an upper layer operating system (hereinafter occasionally abbreviated as "OS") have been proposed in order to speed up the protocol processing.

Hereinafter, conventional protocol processing methods when a paket processing device receives and terminates IP packets will be described:

(1) Zero-copy TCP Method

Generally, a memory space where an OS kernel operates and a memory space where each user program operates are strictly separated from each other in an application executing OS. Therefore, in order that the kernel receives packets from network and passes the data arrived at a TCP socket buffer to a communication application which operates on the OS, it is necessary to perform a memory copy from a kernel memory space to a user memory space according to a regular procedure.

The zero-copy TCP method offers a mechanism which makes a ,part of the OS kernel memory space accessible from the application so that the application can access the receiving socket buffer of the TCP.

As a result, the memory copy which takes a long processing time in the protocol processing within the OS becomes unnecessary and the OS protocol processing is sped up.

(2) I2O method

This method is based on an interface specification in which the protocol processing or the like which has been performed by the OS on a main processor is to be performed by a sub processor on a network interface.

Namely, an OS different from the OS on the main processor is operating in a sub processor on a NIC, so that the communication protocol processing is performed within this OS and then it transfers data after the processing to the main processor OS.

As a result, a load of the main processor is reduced and the protocol processing is sped up.

(3) Communication control device of large-scale host computer

A communication method between host computers using communication processing devices connected to the host computers by channels is disclosed in the Japanese Patent Laid-open Publication No.4-292039.

Generally in the channel between the host computer and the communication processing device, the communication is performed with big size data packets generated in a transport layer of the host computer.

In this method, the big size packets transmitted by a transmitting host computer are divided according to MTU of a transmission line within a subnet section between the communication processing devices. A receiving communication processing device reassembles the original big size packet to be passed from the communication processing device to a receiving host computer.

As a result, the efficiency of channel utilization between the host computer and the communication processing device can be improved.

(4) L3 Switch Method

The L3 switch used in this method, as mentioned above, has a packet forwarding function in the network layer using hardware logic. Also, the L3 switch is thought to be same as the existing router except it has a hardware packet forwarding function in the network layer, so that it can be substituted for a router.

Moreover, some of the routers have highly developed communication control functions such as a fire wall, a Proxy server, and the like and determine whether or not each communication session may be passed. With the appearance of the L3 switch, an architecture which has such highly developed communication control functions on the L3 switch has appeared.

FIG. 19 shows the above-mentioned architecture wherein an OS kernel 20 operates on an L3 switch 81 and an application 11 runs on this OS kernel 20.

The L3 switch 81 transfers a receiving packet 90 as a transmitting packet 95 after switched through a receiving interface 31, a routing process circuit 83, an SW portion 84, an output buffer 85, and a transmitting interface 46 (see route (1) in FIG. 19).

Also, a part of the receiving packet 90 is sent from the receiving interface 31 to a protocol processor 86 of the OS kernel 20 where filtering or the like is performed and then returned to the output buffer 85 (see route (2) in FIG. 19). Moreover, a part of the receiving packet 90 is sent to the application 11 such as the fire wall or the like for judging if the traffic is permitted to be forwarded (see route (3) in FIG. 19).

In such a fire wall equipment, after first several packets for the identification of communication session or packets for the authentication are identified by the software, filtering conditions of communication sessions are recorded in a filtering table of a hardware so as to be identifiable by the hardware logic and the following session identifications are performed by the hardware at a high speed.

In this case, the speed-up is achieved by processing the filtering on the hardware of the L3 switch 81. However, several packets for the session identification, communication sessions for the management of the L3 switch, or complicated authentication functions are processed by a software in the upper layer.

FIG. 20 shows the L3 switch 81 shown in FIG. 19 in more detail wherein the receiving interface (RX) 31 for inputting the receiving packet, a routing processor 75, a header rewriting portion 76, an input SW portion 77, a shared memory 78, an output SW portion 79, and the transmitting interface (TX) 46 for sending out the transmitting packet 95 are connected in series.

Also, the shared memory 78, a CAM 74, a CPU 71, and a main memory 72 are mutually connected by a bus 73. The shared memory 78 is further connected to a buffer control circuit 37 and the CAM 74 is connected to the routing processor 75.

In operation, the receiving packet (for example, Ethernet frame) 90 received from a network is accumulated in an input buffer (FIFO) of the receiving interface 31.

The L3 switch is able to switch an L2 (Layer 2) frame and an L3 (Layer 3) IP packet by a hardware.

The L2 switch function learns a source address of an Ethernet frame inputted to each port to prepare a learning table which makes an Ethernet address correspond with an output interface.

The L2 switch function retrieves the learning table with a destination MAC address as a key after having performed the CRC check to the received Ethernet frame. In case the learning table indicates the Ethernet address of its own receiving interface, the L2 switch function performs the receiving process as the frame is addressed to this L3 switch.

First of all, a hardware routing table (not shown) is retrieved with a destination IP address of the IP packet as a key. The routing table is written in the memory 74, which sometimes consists of a CAM (Content Addressable Memory), in the form of a corresponding table of IP addresses and ports or Ethernet addresses based on routing information managed by the OS. By retrieving the table by IP address as a key, an output port or an Ethernet address may be outputted.

When the routing table is retrieved, resulting in that the packet is not addressed to that device itself but required to be forwarded to another router or host, the packet is sent to the input SW portion 77 with the destination and the source address of the Ethernet frame header respectively assigned with an Ethernet address of the next hop obtained from the routing table look-up and an Ethernet address of the own output port.

The input SW portion 77 refers to the learning table by the destination Ethernet address of the frame header to determine a port to be outputted. Afterwards, the frame itself is stored in the shared memory 78, and an entry is added to a queue of the buffer control circuit 37 which controls the output order of each output interface. As described information of each queue entry, a start address of the shared memory 78 where the frame is stored is written.

The output SW portion 79 takes out a start address of a frame which should be transmitted next for each interface from the queue of the buffer control circuit 37 and takes out the frame from the shared memory 78 referring to the start address, then transfers to the transmitting interface 46.

The transmitting interface 46 transmits that data frame by a CSMA/CD access method to send frames to the transmission line.

Also, if the receiving packet is an IP packet addressed to itself, a queue addressed to CPU 71 is prepared in the buffer control circuit 37 to switch that packet to itself. When the frame arrives at the queue in addressed to itself, an interrupt is raised to the OS operating on the CPU 71 so that the frame is received by having the OS access the shared memory 78.

In order to maintain secrecy and to avoid attacks from outside, a private network such as an enterprise network has a mechanism which enables the access to the Internet from the inside of the private network but disables the access to the private network from the outside thereof by using a device called a "fire wall" to be connected to the Internet.

FIG. 21A shows the simplest example for connecting a private subnet 63 to the Internet 65 through a fire wall.

A host 61 which is connected to the private subnet 63 is communicating through a Proxy server router (L3 switch) 64 with a host 62 which is connected to the external Internet 65.

The packet is first filtered at the router, and then judged if the packet is permitted to be forwarded by the function of the fire wall.

While a dedicated device is generally used for the router 67 as shown in FIG. 21B, the fire wall, which is a software product in many cases, is operated on a general-purpose computer such as a workstation.

Namely, the network systems have been constructed by using distinct router 67 and fire wall 66.

However, the L3 switch (router) which has a forwarding function of IP packets using a hardware logic has rapidly improved the router's forwarding rate by speeding up the packet forwarding process in the network layer.

Since this L3 switch enables a packet filtering by the hardware, devices have appeared which perform a part of the filtering process of a fire wall product by hardware.

Such a product enables the hardware filtering by replacing the filtering condition or the like which is set for the fire wall software to perform within the OS with the filtering condition for the hardware to be set to the L3 switch hardware.

(5) Improved NIC Device With Reduced OS Interrupts

As for the NIC device equipped on a computer system, there are products which aim to avoid an overhead of the OS by reducing the number of interrupts to the OS when the packets are received by the hardware from network.

Generally, when the NIC device receives a packet, it raises an external interrupt to the OS. The interrupted OS copies the packet from the receiving buffer on the NIC device to a memory space which is controlled by the OS. In this case, since the OS is interrupted every time the NIC device receives a packet for the packet processing, it has a big overhead.

Therefore, the improved NIC device method uses a technology in which the OS is interrupted after receiving a plurality of packets and then the OS copies each packet to the memory space of the OS to reduce the number of OS interrupts, thereby reducing the processing overhead within the OS.

Hereinafter, problems of such devices which equip the conventional packet processing technic will be described.

(1) Although the Zero-copy TCP method eliminates the overhead of copying data from the OS kernel address space to the user address space, the operation of the OS having the hardware receive the packets is the same as the conventional software processing, so that the packet forwarding by the hardware is disturbed as the number of packets passed to the software processing increases.

(2) As for the packet reception seen from the upper layer OS by the I2O method, the number of interrupts to the OS is decreased and the size of the packet to be received is enlarged up to a data unit in the application layer. However, since a lower layer OS within the network interface performs an ordinary packet reception, from the viewpoint of packet forwarding by the hardware, the hardware processing is blocked when the number of the received packets increases.

(3) Communication control device of large-scale host computer

Nowaday communication hosts have thereon network protocols including a data link layer for various LAN media but do not divide a packet at a transport layer which is originally big into smaller ones for the transmission, and do not reassemble into a big packet at a transport layer of a receiving host as disclosed in the Japanese Patent Laid-open Publication No.4-292039.

(4) As for the L3 switch method, the OS accesses the receiving buffer memory in the hardware after switching contexts by the interrupt raised per each packet reception. While this L3 switch performs the network layer packet forwarding processed by a high-speed hardware, the memory access from the OS causes the packet forwarding of the hardware to be blocked and degrades the routing performance.

(5) As for the improved NIC device method with reduced OS interrupts, while the interrupt processing of the software decreases, the overhead to access hardware memory by the OS do not decrease because the OS performs the processing of the received packets for each packet, not for the number of interrupts.

Also, the fire wall device mounting the L3 switch has problems at present as follows:

(1) Since this is devised by assuming the filtering and the policy setting which may be achieved by the hardware of the L3 switch, a complex session identification or the like requires a software processing.

(2) Since the hardware processing for the traffic via an application cannot be performed by the L3 switch, an application gateways which looks into the contents of a packet cannot achieve a satisfactory performance.

SUMMARY OF THE INVENTION

It is an object, of the present invention to provide a packet processing device which realizes a layered communication protocol processing wherein a packet processing is sped up without influences between processes in each layer.

For the achievement of the above object, the packet processing device according to claim 1 of the present invention comprises a receiving buffer of an upper layer, a first means for notifying a free space of the receiving buffer, a second means for reassembling plural receiving packets into a single big packet based on the free space to be transmitted to the receiving buffer, and a third means for determining a size 6f the big packet based on the free space.

Namely, as shown in a principle (1) of a packet processing device 10 according to the present invention of FIG. 1, a second means, i.e. a reassembly buffer processor 301 in a lower layer protocol processor 300 reassembles plural receiving packets 91 into a single big packet 92. In this case, a third means, i.e. an accumulation condition-determining portion 303 determines the size of the big packet 92 based on a free space 93 of a receiving buffer 101 from a first means, i.e. a receiving buffer free space notifying portion 102.

When the determined size is attained by the big packet 92, the reassembly buffer processor 301 can transmit the big packet 92 to the receiving buffer 101 of an upper layer protocol processor 100.

It is to be noted that a layer in which the free space notifying portion 102 is allocated, as will be described later, is not necessarily an upper layer. Also, a receiving packet 90, a connection identifying circuit 302 and a checksum calculating circuit 304 shown in FIG. 1 will be described later. In the foregoing description, each of the receiving packets 91 and the receiving packet 90 are the same, since a connection of the receiving packet 90 is not identified.

As a result, the number of packets arriving at the receiving buffer 101 in the upper layer can be reduced, thereby reducing a processing amount required for the packet transmission in the communication protocol and a high-speed transmission of the packets become enable.

Also, in the present invention according to claim 2, the first means may be included in the upper layer and notify the free space to the third means.

Namely, the free space notifying portion 102 allocated in the upper layer can detect the free space 93 of the receiving buffer 101 to notify it to the accumulation condition determining portion 303 in the lower layer.

Also, in the present invention according to claim 3, the first means may comprise a backward packet inclusive information reading circuit for detecting the free space based on information within a backward packet from the upper layer.

FIG. 2 shows a principle (2) of the present invention in which a difference from FIG. 1 is that a backward packet inclusive information reading circuit 305 is added to the lower layer instead of the free space notifying portion 102 in the upper layer.

Namely, the information reading circuit 305 may be allocated in the same layer with the reassembly buffer processor 301 to be informed of the free space 93 of the receiving buffer by referring to free space information of the receiving buffer 101 included in a backward packet 94 from the upper layer so that this free space 93 can be notified to the accumulation condition determining portion 303.

Also, in the present invention according to claim 4, the upper layer may comprise a transport layer.

Namely, the receiving buffer 101 can be the receiving buffer of the transport layer and the reassembly buffer processor 301 can be allocated in the lower layer of the transport layer so that the big packet 92 assembled at the buffer processor 301 can be transmitted to the receiving buffer 101.

Also, in the present invention according to claim 5, the upper layer may comprise an application layer and the big packet may be transmitted not through a buffer of a transport layer but directly to the receiving buffer.

FIG. 3 shows a principle (3) of the present invention, in which the difference from FIG. 1 is that there is a middle layer protocol processor 200 between the upper layer protocol processor 100 and the lower layer protocol processor 300.

Namely, data in the big packet can be transmitted from the reassembly buffer processor 301 allocated in the transport layer which corresponds to the lower layer to the receiving buffer 101 in the application layer which corresponds to the upper layer without any flow control in the middle layer.

As a result, a high-speed transmission of the packets is enabled in a communication protocol which does not perform a flow control in the middle layer.

Also, the present invention according to claim 6 may further comprise a connection identifying circuit for identifying a connection of the receiving packets, so that the second means can reassemble the big packet for each connection based on identification information of the identifying circuit.

Namely, the connection identifying circuit 302 shown in FIG. 1 identifies the connection of the receiving packet 90 so that the reassembly buffer processor 301 can reassemble the receiving packet 91 resulting from the identification into the big packet 92 for each identical connection.

As a result, plural connections can be identified.

Also, the present invention according to claim 7 may further comprise a checksum calculating circuit for adding a checksum to the big packet.

Namely, the checksum calculating circuit 304 shown in FIG. 1 can calculate a checksum to be added to the big packet 92.

As a result, the reception of the big packet is enabled without contradiction in a checksum error detection at the middle layer protocol processor.

Also, in the present invention according to claim 8, the third means may have a timer for giving the second means instructions for transmitting the big packet to the receiving buffer when a predetermined time elapses.

Namely, the accumulation condition determining portion 303 starts the timer when the reassembly buffer processor 301 assembles the big packet 92. When the time-out occurs before the big packet 92 attains the predetermined size, the reassembly buffer processor 301 which has been notified of the time-out transmits the big packet 92 to the receiving buffer 101.

As a result, a transmission delay and resending operations caused by prolonging the time for assembling the big packet 92 can be avoided.

Also, in the present invention according to claim 9, the third means may give the second means instructions for assigning the big packet to the receiving buffer at a time when the big packet attains a size at which it is estimated that an acknowledgement packet is sent from the upper layer.

Namely, it is ordinary that when a capacity of the packet received by the receiving buffer 101 becomes larger than a predetermined capacity, the packet maintained by the receiving buffer 101 is transmitted to a buffer in a further upper layer and an acknowledgement (ACK) packet is sent to the lower layer.

Therefore, the accumulation condition determining portion 303 gives the reassembly buffer processor 301 instructions for transmitting the big packet 92 to the receiving buffer 101 when the size of the big packet 92 attains the size at which the ACK packet is thought to be sent.

As a result, the big packet 92 which is transmitted to the receiving buffer 101 is immediately transmitted to the buffer in the upper layer and the ACK packet is sent quickly so that the high-speed transmission of the packets to the upper layer is enabled.

Also, in the present invention according to claim 10, the second means may assemble the big packet with a first receiving packet including a header and subsequently received packets whose headers are deleted.

Namely, the second means can assemble the big packet with the first receiving packet whose header is not deleted and data of the subsequent receiving packets whose headers are deleted.

As a result, a header with the same format as the receiving packet can be set in a header of the big packet so that the present packet processing device can adopt the upper layer protocol without changing it for receiving the big packets.

Also, the big packet enables upper layer to receive lesser packet octets by deleting headers, so that a faster transmission of the packets to the upper layer become possible.

Also, the present invention according to claim 11 may further comprise means for immediately transmitting the receiving packet to the receiving buffer without storing the receiving packet in the second means when the receiving packet is a non-accumulation packet.

Namely, the receiving packet 91 which includes data requiring an urgent processing can be transmitted immediately to the receiving buffer 101 in the upper layer without being transferred through the reassembly buffer processor 301.

Also, the present invention according to claim 12 may comprise, in addition to the above, an L3 switch which has a packet forwarding function in a network layer made by a hardware logic and transmits plural receiving packets addressed to its own device to the second means.

Namely, the L3 switch sends only the received packets addressed to itself in the received packets to the second means. The second means can reassemble a single big packet with plural receiving packets based on the size of the free space to be sent to the receiving buffer in the upper layer.

As a result, the received packets addressed to itself can be received without blocking the packet forwarding operation of the L3 switch so that the total packet processing performance can be improved.

Moreover, in the present invention according to claim 13, an NIC device comprises the packet processing device according to claim 1 for transmitting plural receiving packets addressed to itself to the second means.

Namely, the NIC device assigns the received packets addressed to itself to the packet processing device. In the packet processing device, the second means assembles a single big packet with a plurality of the receiving packets based on the size of the free space to be assigned to the receiving buffer in the upper layer of the NIC device.

As a result, the OS in the upper layer of the NIC device can reduce the number of processing of the receiving packets addressed to itself so that the overhead of the OS can be eliminated.

BRIEF DESCRIPTION OF THE DRAWINGS

FIG. 14 is a format diagram illustrating a structure example of a connection queue of a packet processing device according to the present invention;

FIG. 15A is a format diagram illustrating a structure example of a service list of a packet processing device according to the present invention;

FIG. 15B is a table of protocol types and their numbers;

Throughout the figures, the same reference numerals indicate identical or corresponding portions.

DESCRIPTION OF THE EMBODIMENTS

Figure 4:
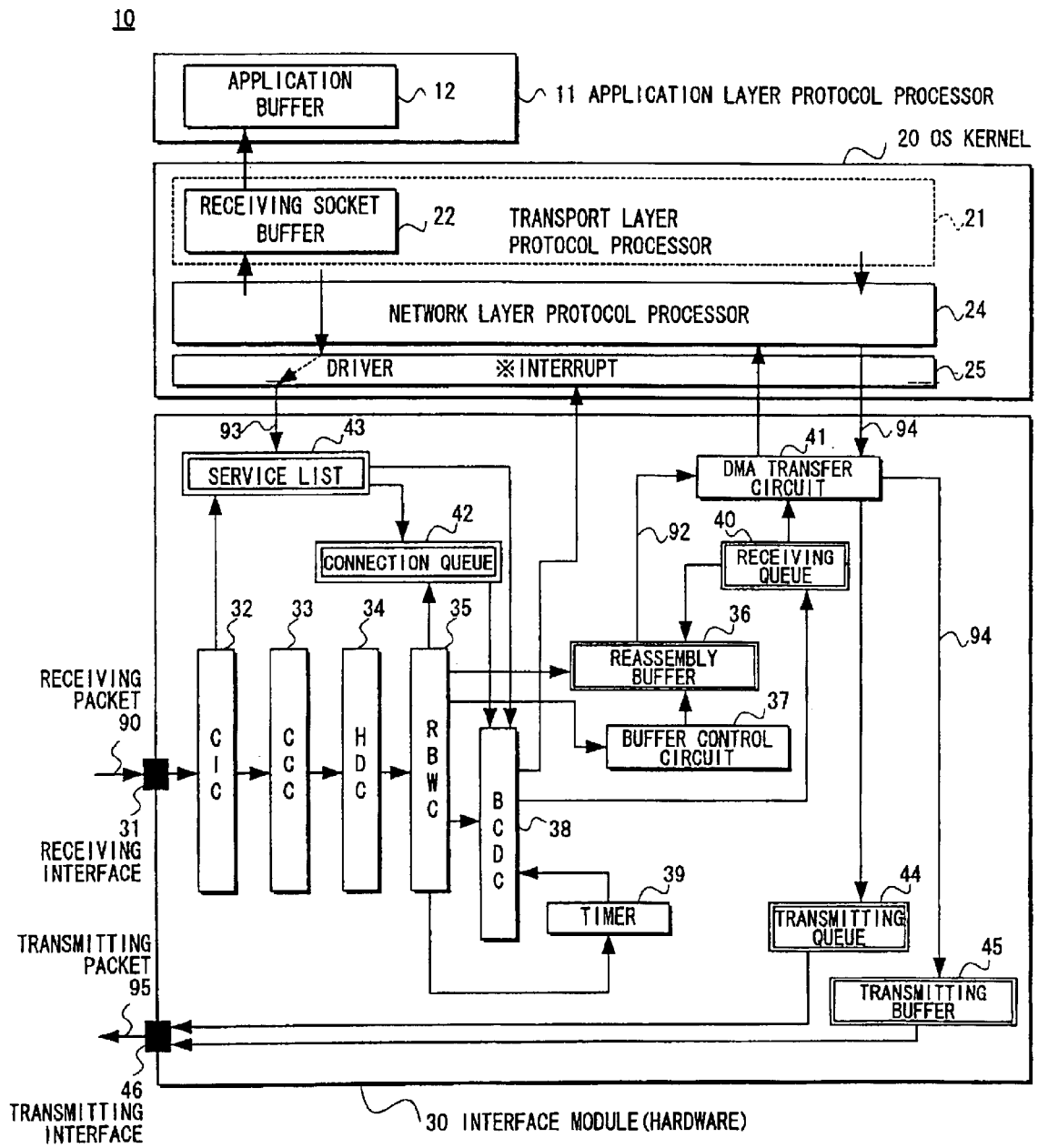
FIG. 4 is a block diagram illustrating an embodiment (1) of a packet processing device according to the present invention.

FIG. 4 shows an embodiment (1) of the packet processing device 10 according to the present invention, wherein the packet processing device 10 is composed of an interface module 30 for transferring a transmitting packet 95 and a receiving packet 90 to/from a network, an OS kernel 20 for transferring the packets to/from the module 30, and an application layer protocol processor (synonymous with "application program" and "application") 11 operating on the OS kernel 20.

The interface module 30 is composed of a receiving interface 31 for receiving the packets, a connection identifying circuit 32, a checksum calculating circuit 33, a header deleting circuit 34, a reassembly buffer writing circuit 35, a reassembly buffer 36, a buffer control circuit 37, a buffer condition determining circuit 38, a timer 39, a receiving queue 40, a DMA transfer circuit 41, a connection queue 42, a service list 43, a transmitting queue 44, a transmitting buffer 45, and a transmitting interface 46 for transmitting the packets 95.

Figure 1:
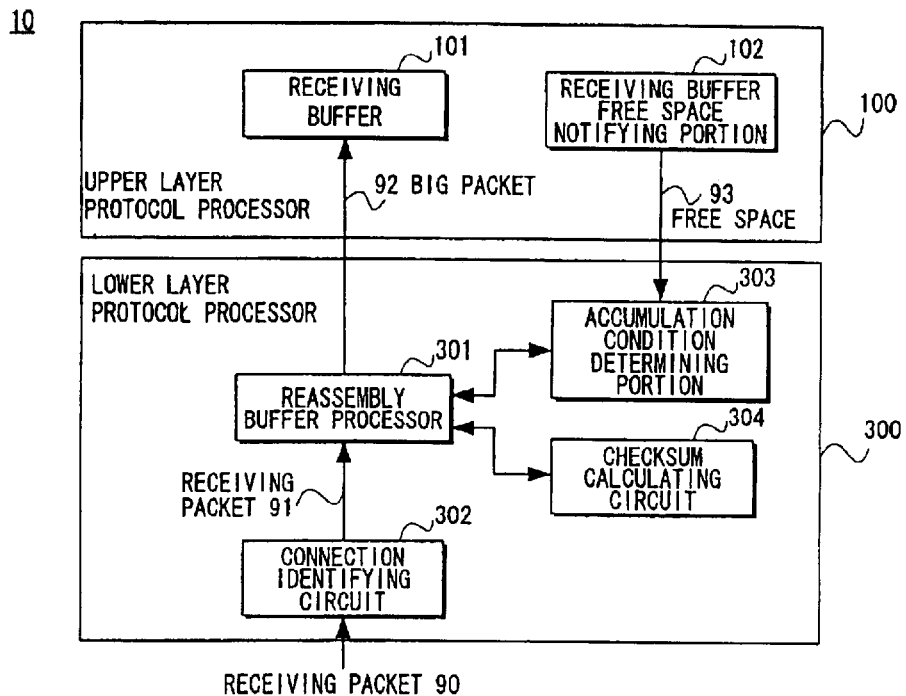
FIG. 1 is a block diagram illustrating a principle (1) of a packet processing device according to the present invention.

It is to be noted that the reassembly buffer writing circuit 35 and the reassembly buffer 36 comprise the reassembly buffer processor 301 shown in FIG. 1.

The OS kernel 20 is composed of a transport layer protocol processor 21 which includes a receiving socket buffer 22, a network layer protocol processor 24, and a driver (device driver) 25.

The application layer protocol processor 11 includes an application buffer 12.

Hereinafter, operating procedures of the embodiment (1) will be described referring to the flow chart shown in FIG. 5.

The protocol processor 11 above the OS kernel 20 establishes a virtual connection with another host to perform communications. In this case, it is assumed that a connection is established from a protocol processor on another host to the protocol processor 11.

The transport layer protocol processor 21 prepares a receiving socket buffer 22 for each connection when the connection from, the other host is established.

Then, the protocol processor 21 requests the driver 25 to write connection identification information and a buffering threshold which indicates the free space 93 (see FIG. 1) of the receiving socket buffer 22 in the service list 43 of the interface module 30.

It is to be noted that this operation can either be performed for the first time only or be frequently done to rewrite them.

Figure 5:
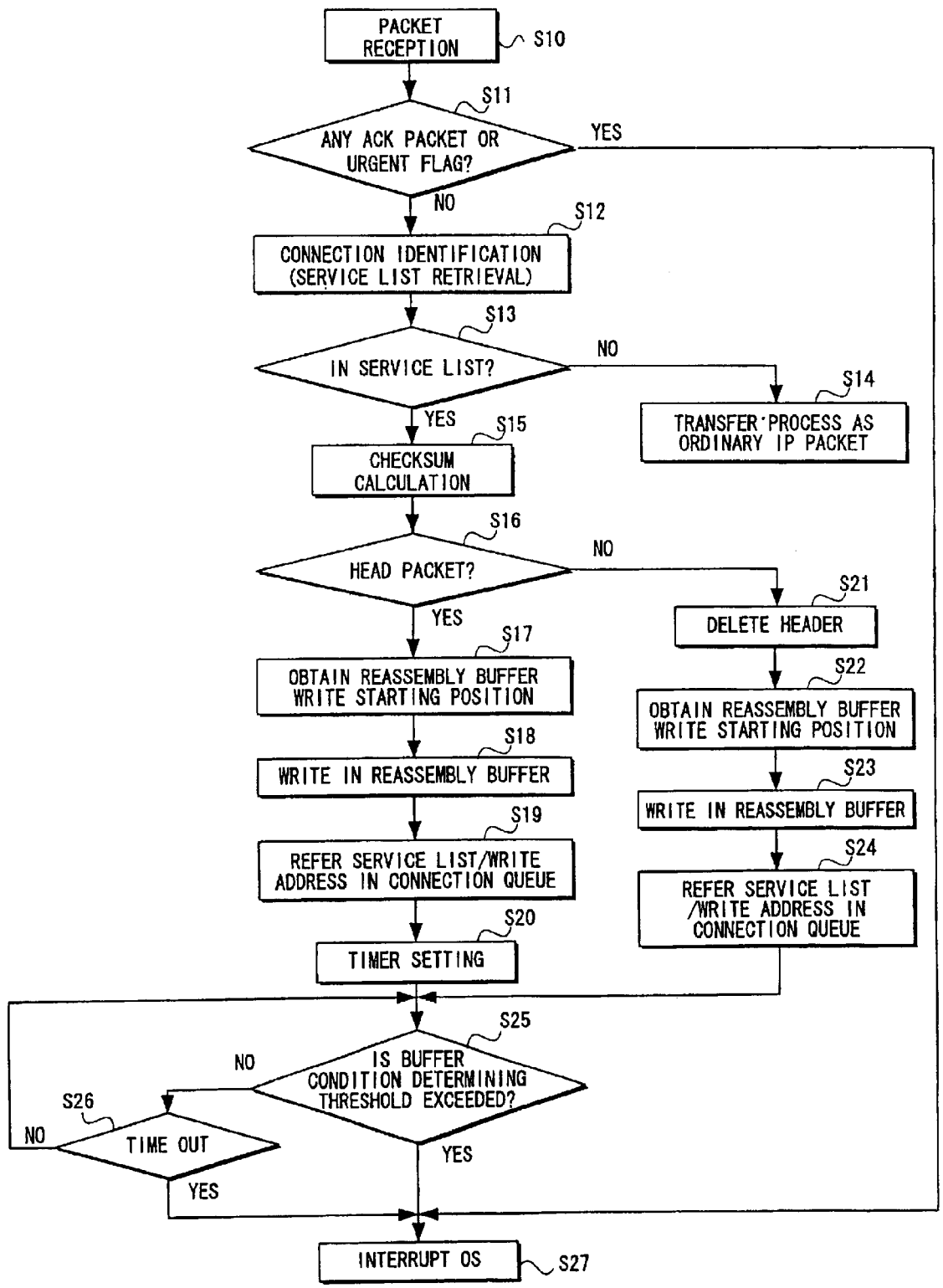
FIG. 5 is a flow chart illustrating operating procedures of the embodiment (1)

The receiving interface 31 receives the receiving packet 90 from a physical network and sends it to the connection identifying circuit 32 (step S10 in FIG. 5).

In case the receiving packet 90 addressed to a connection identified by the connection identifying circuit 32 is a non-accumulation packet such as an ACK packet or a packet with an urgent flag="ON", the connection identifying circuit 32 transmits the non-accumulation packet to the OS kernel 20 without accumulation and immediately transmits a big packet in the reassembly buffer, which will be described later, to the OS kernel 20 (YES for step S11 in FIG. 5).

Also, the connection identifying circuit 32 retrieves the service list with a network layer header of the receiving packet 90 or connection identification information of a data link layer header as keys to identify whether or not the receiving packet 90 is desired to be received in its own device (steps S12, S13).

If the connection identification information is not in the service list 43, it is determined that the packet is not addressed to its own device so that a transfer process is performed as an ordinary IP packet (step S14).

If there is a hit entry in the service list 43, the checksum calculating circuit 33 calculates a checksum to check if the data packet of the transport layer included in the receiving packet is normal (step S15).

The header deleting circuit 34 determines whether or not the receiving packet 90 is a head receiving packet from which the accumulation is started (step S16).

If it is the case, the header deleting circuit 34 transfers the packet to the reassembly buffer writing circuit 35 keeping the header of the network layer and the data link layer attached. The writing circuit 35 obtains a position to start writing in the reassembly buffer 36 by inquiring the buffer control circuit 37 (step S17) and writes the head packet in the reassembly buffer 36 (step S18).

Moreover, the writing circuit 36 refers to the service list 43, and writes a write address (reassemble start address) of the reassembly buffer 36 in the connection queue 42 pointed by the pointer of the service list (step S19), and thereafter sets the timer 39 to expire after a fixed time (step S20).

If it is not the case, the header deleting circuit 34 deletes the headers in the network layer and the data link layer in the receiving packet 90 to be transferred to the writing circuit 35 (step S21). The writing circuit 35 performs the same operations as the steps S17–S19 to assemble the big packet 92 (see FIG. 1) (steps S22–S24).

Also, the writing circuit 35 writes information of the number of the receiving packets and a big packet length to the connection queue 42.

As a result, the buffer condition determining circuit 38 compares a buffering threshold 93 written in the service list 43 with the big packet length written in the connection queue 42.

If the buffering threshold is exceeded (step S25), the determining circuit 38 obtains from the connection queue 42 the reassemble start address of the big packet within the reassembly buffer which is written in the receiving queue, and the connection queue 42 is dequeued in advance. Also, an interrupt signal is issued for notifying the OS kernel 20 that the big packet has been received (step S27).

In case the receiving packet 90 has not yet arrived and the time out occurs without having the buffering threshold exceeded by the big packet length (step S26), the timer 39 notifies this to the buffer condition determining circuit 38. The buffer condition determining circuit 38 writes the reassemble start address within the reassembly buffer in the receiving queue 40, clears the connection queue 42 to be dequeued, and issues an interrupt to the OS for notifying that the packet has been received (step S27).

In the OS kernel 20 which has received the interrupt, the driver 25 makes a structure within the OS memory space for controlling the big packet and determines an address position for actually copying the big packet on the main memory (not shown).

The DMA transfer circuit 41 copies the big packet reassembled within the reassembly buffer 36 to the main memory and raises an interrupt for a copy completion to the network layer protocol processor 24.

The protocol processor 24 performs a header processing of the received big packet to be transferred to the transport layer protocol processor 21.

The receiving socket buffer 22 of the protocol processor 21 generally accumulates the received data and performs an ACK packet returning operation after accumulating a fixed quantity.

Since the big packet has been set in the reassembly buffer 36 so as to have a data size such as satisfying a condition for returning an acknowledgement, the receiving socket buffer 22 immediately transmits an ACK packet and copies the big packet to the application buffer 12.

As a result, a processing load for the receiving packets on the OS kernel 20 can be reduced.

Figure 6:
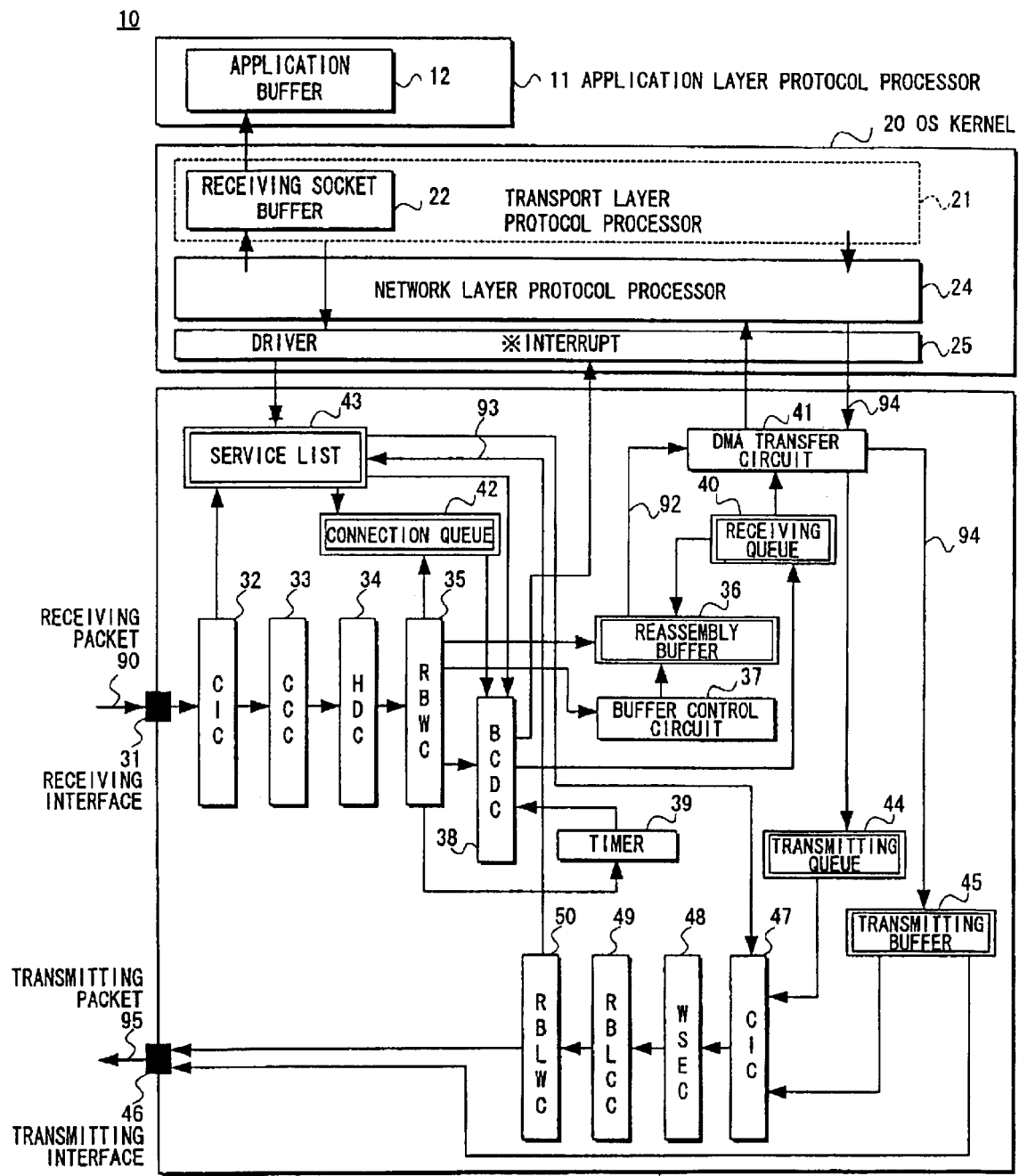
FIG. 6 is a block diagram illustrating an embodiment (2) of a packet processing device according to the present invention.

FIG. 6 shows an embodiment (2) of the packet processing device 10 according to the present invention. The difference between this packet processing device 10 and the one in the embodiment (1) is that a connection identifying circuit 47 for identifying the connection of the transmitting packet, a window size extracting circuit 48, a receiving buffer length calculating circuit 49, and a receiving buffer length writing circuit 50 are inserted in series between the transmitting buffer 45 and the transmitting interface 46 in the interface module 30.

Figure 7:
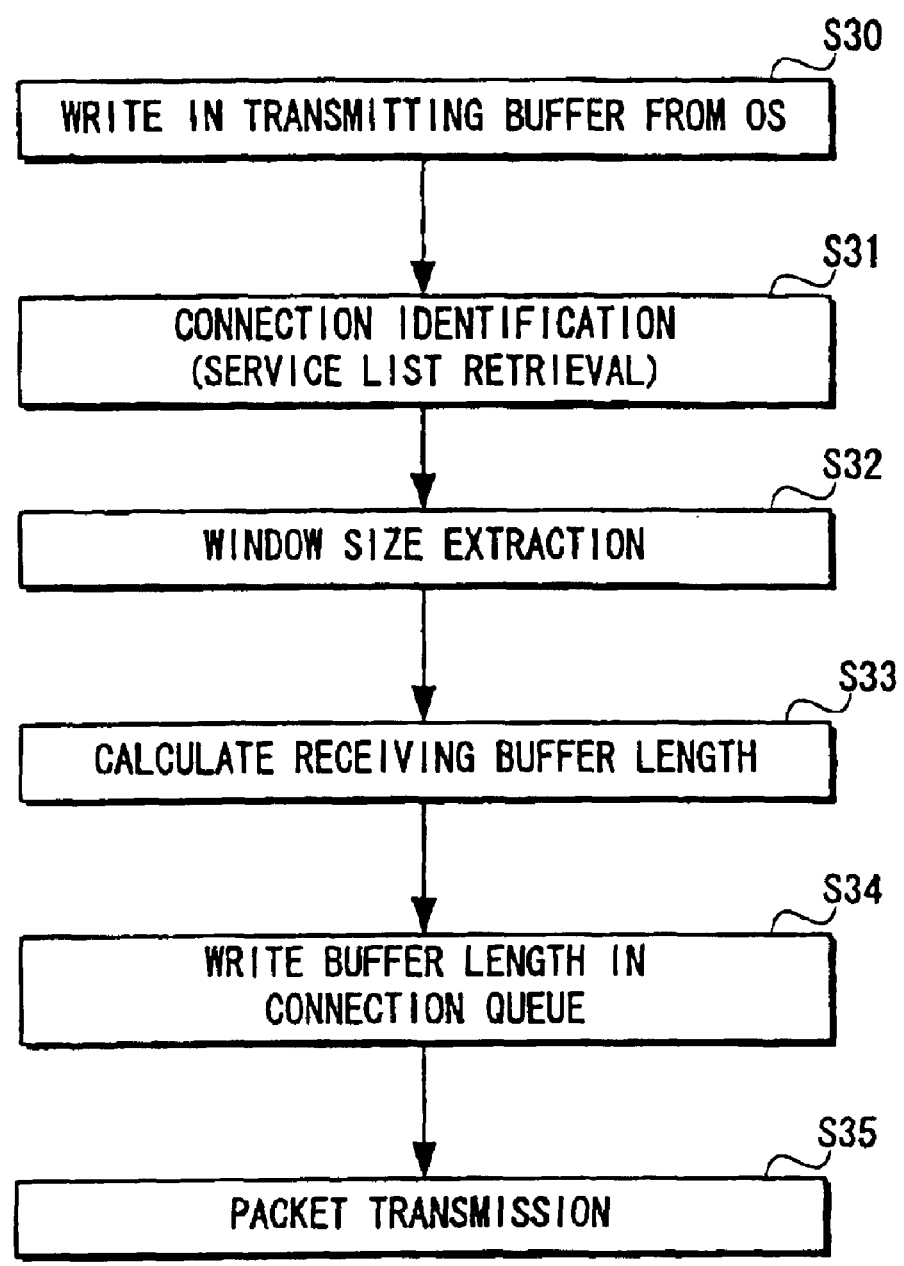
FIG. 7 is a flow chart illustrating operating procedures of the embodiment (2)

Operating procedures of the embodiment (2) are those of the flow chart of the embodiment (1) shown in FIG. 5 to which the flow chart of FIG. 7, which can be combined therewith, is added.

Hereinafter, the operating procedures of the embodiment (2) will be described referring to FIG. 7.

In this embodiment (2), as in the embodiment (1), the case in which a virtual connection from another host is established in the protocol processor 11 above the OS kernel 20.

As in the embodiment (1), the receiving socket buffer 22 is prepared for each connection and the protocol processor 21 requests the driver 25 to write the connection identification information and the maximum value of the socket buffer as the buffering threshold 93 in the service list 43.

Figure 2:
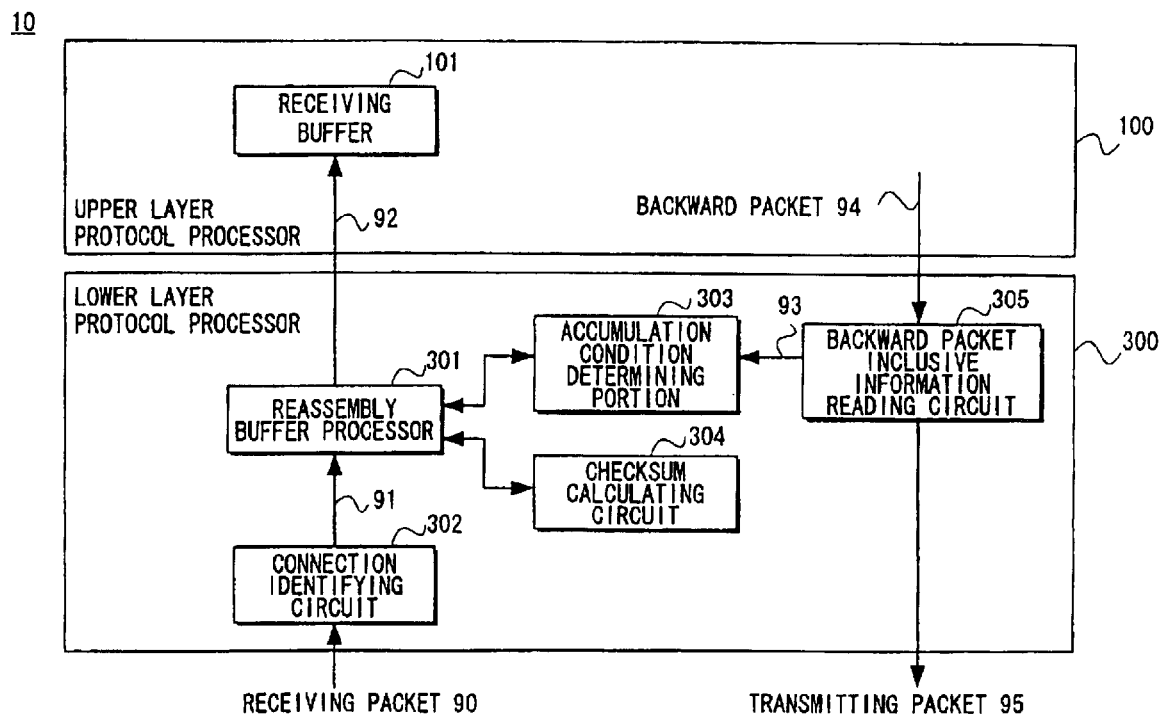
FIG. 2 is a block diagram illustrating a principle (2) of a packet processing device according to the present invention.
Figure 3:
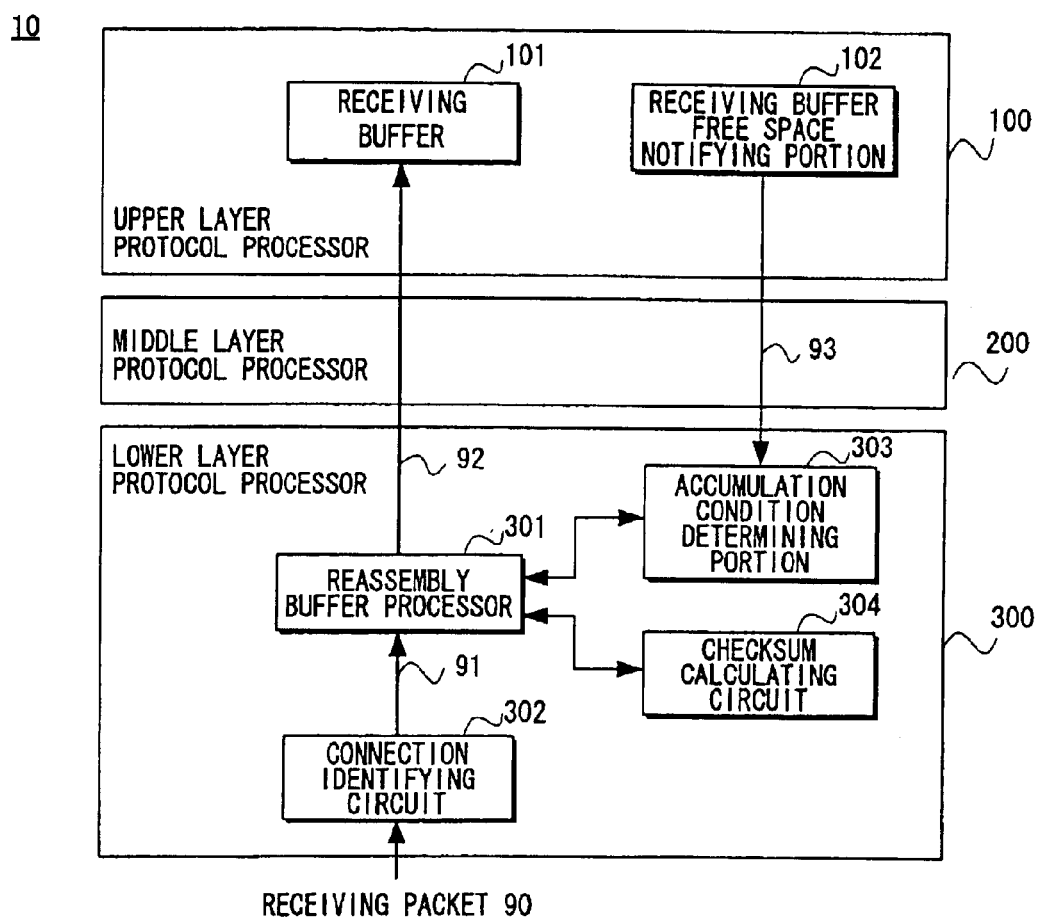
FIG. 3 is a block diagram illustrating a principle (3) of a packet processing device according to the present invention.

The transport layer protocol processor 21 transfers the backward packet 94 (see FIG. 2; hereinafter referred to as the "transmitting packet 94") which is the ACK packet or the like for the big packet from the main memory where the OS kernel 20 is operating to the transmitting buffer 45 through the DMA transfer circuit 41, and the transmitting packet 94 is queued in the transmitting queue 44 in the order of transmission (step S30 in FIG. 7).

The transmitting packet 94 is taken out of the transmitting buffer 45 based on the transmitting queue 44 to be sent to the connection identifying circuit 47.

The connection identifying circuit 47 retrieves the connection given by the network header portion and the transport layer header portion of the transmitting packet 94 by referring to the service list 43 (step S31).

If the corresponding connection resides in the service list 43, the transmitting packet 94 is sent to the window size extracting circuit 48.

The window size extracting circuit 48 extracts a window size which indicates the free space of the receiving socket buffer 22 from the transport layer header of the transmitting packet to be transferred to the receiving buffer length calculating circuit 49 (step S32).

The receiving buffer length calculating circuit 49 calculates a data size which satisfies the condition for the receiving socket buffer 22 of the protocol processor 21 to transmit the ACK packet (step S33). The receiving buffer length writing circuit 50 writes the result of the calculation as the buffering threshold 93 in the service list 43.

Afterwards, the transmitting packet 94 is sent out to the physical network through the transmitting interface 46.

Operations for the packet 90 received by the receiving interface 31 from the physical network are the same as those shown by steps S10–S27 in FIG. 5.

However, the buffering threshold 93 of the service list 43 which can be referred in the step S25 is calculated by the receiving buffer length calculating circuit 49 based on the window size information of the transmitting packet 94.

As a result, it becomes possible to dynamically change the size of the big packet according to the free space of the receiving socket buffer 22. The big packet which is transmitted to the receiving socket buffer 22 is immediately sent to the application buffer 12 so that a packet processing time in the OS kernel 20 is shortened.

Figure 8:
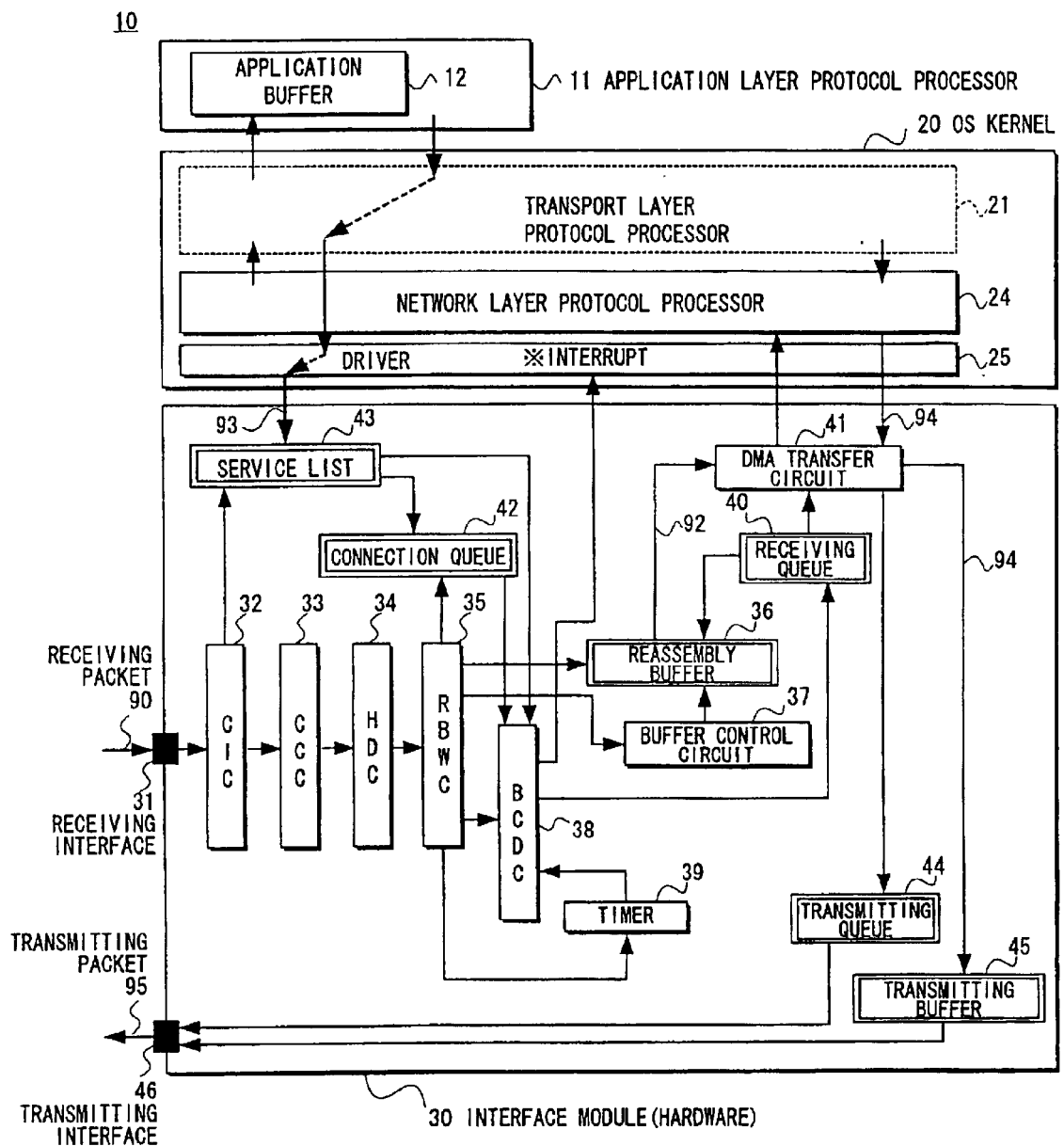
FIG. 8 is a block diagram illustrating an embodiment (3) of a packet processing device according to the present invention.

FIG. 8 shows an embodiment (3) of the packet processing device 10 according to the present invention. The difference between this packet processing device 10 and the one in the embodiment (1) is that there is no receiving socket buffer, the big packet of the reassembly buffer 36 are transmitted to the application buffer 12 through the DMA transfer circuit 41 without performing the flow control of the transport layer, and the free space 93 of the application buffer 12 is sent to the service list 43.

Figure 9:
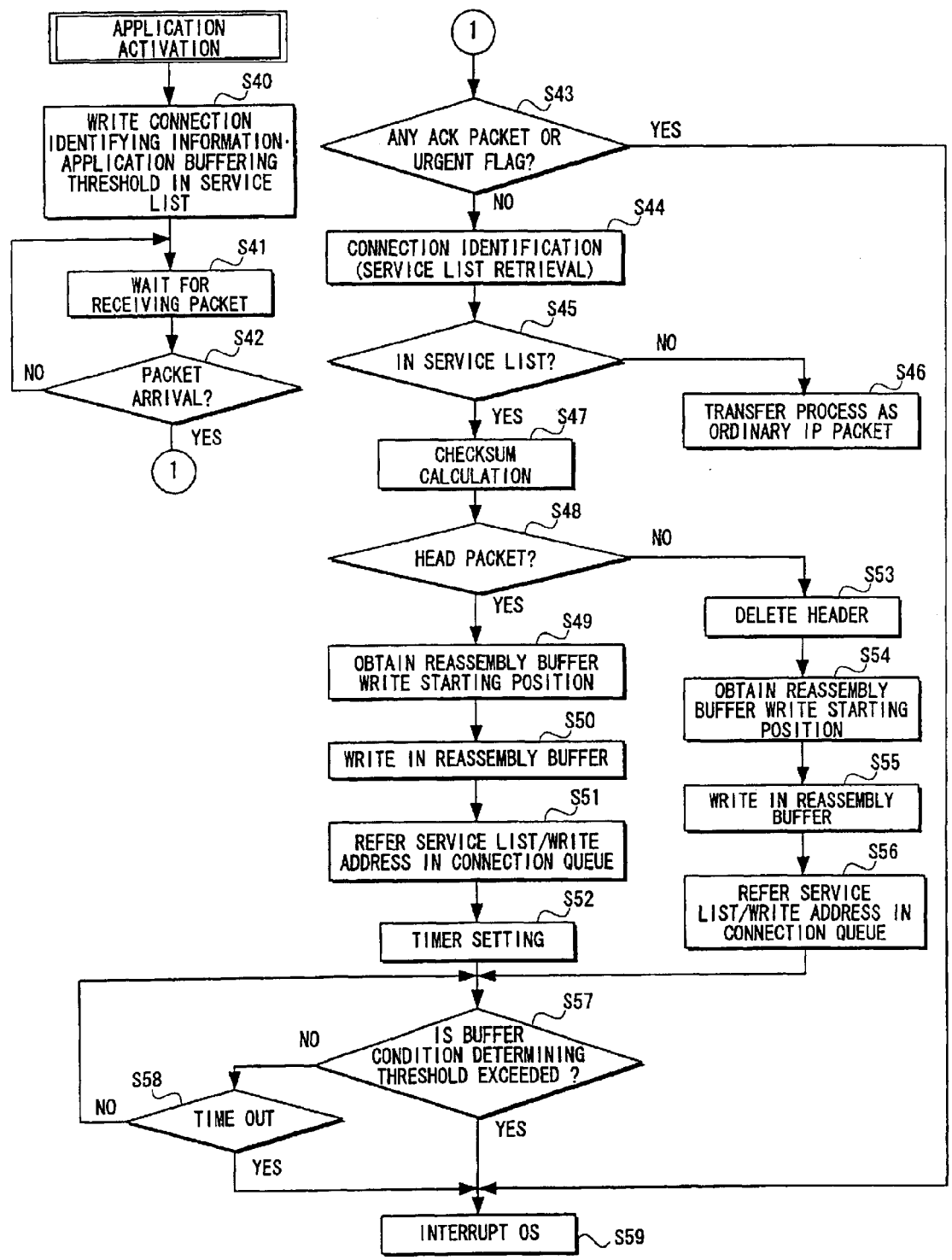
FIG. 9 is a flow chart illustrating operating procedures of the embodiment (3)

FIG. 9 is a flow chart showing operating procedures of the embodiment (3). Hereinafter, the operation of the embodiment (3) will be described referring to this flow chart.

Although the transport layer protocol processor 21 of the embodiment (3) does not perform the flow control for each connection, a plurality of destination applications can be identified by the port numbers or the like. The protocol processor 11 performs a communication on the OS kernel 20 which adopts this protocol processor 21.

Also, this description of the embodiment (3) deals with the case in which data are being transmitted from an application of another host to the application protocol processor 11.

In such a transport layer protocol, a communication performed between source and destination processes is called a session since it can be regarded as a connectionless communication, for example, using a UDP protocol.

First of all, prior to the communication, the protocol processor 11 prepares the application buffer 12 for data in the receiving packet (big packet). Then, the buffering threshold 93 of the reassembly buffer 36 is determined by the capacity of the application buffer 12 to be notified to the OS kernel 20 by a system call.

The OS kernel 20 writes the buffering threshold 93 in the service list 43 on a hardware memory of the interface module 30 through the driver 25. This writing can be performed either for the first time only or repeatedly.

The protocol processor 21 requests the driver 26 to write the identification information of the communication session in the service list 43 (step S40 in FIG. 9).

The receiving interface 31 waits for the receiving packet 90 which arrives from a packet physical network and transfers the received packet 90 to the connection identifying circuit 32 (steps S41 and 842). It is to be noted that although the identifying circuit 32 should be referred to as a session identifying circuit, it will be hereby referred to as the connection identifying circuit 32 for the sake of convenience since its purpose of use and contents of operation are the same as those of the connection identifying circuit 32 in the embodiments (1) and (2). The same thing is applied to the connection queue.

The operations of the following steps S43–S59 are the same as steps S11–S27 shown in FIG. 5.

However, at step S44, the connection identifying circuit 32 identifies whether or not the receiving packet 90 is the packet of the session which it controls by retrieving the service list 43 with session identification information of the headers in the network layer and the datalink layer of the packet 90 as keys.

Also, the buffering threshold 93 used at step S57 is the free space 93 of the application buffer 12.

Also, at step S59, by raising the interrupt to the OS, the big packet of the reassembly buffer 36 is removed therefrom with a transport layer header and the data in the packet are transferred to the application buffer 12.

Also, when a non-accumulation packet which does not allow a delay arrives, it is the same as the embodiment (1) in that the interface module 30 transmits it to the OS without accumulation and the big packet which is being accumulated in the reassembly buffer is also transmitted immediately to the OS.

As a result, the packets are transmitted to the application buffer 25 at a further higher speed compared to the embodiment (1).

Figure 10:
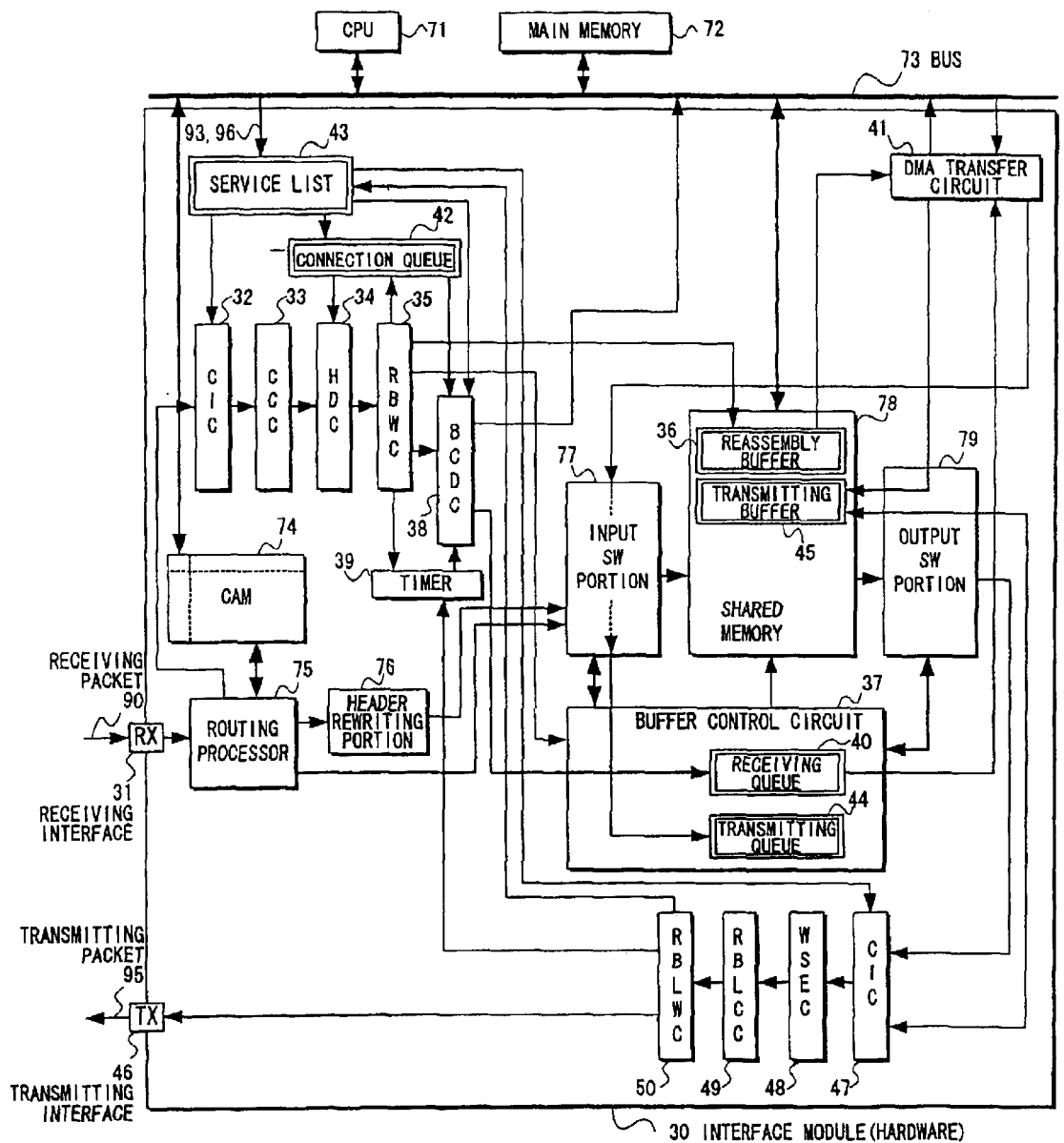
FIG. 10 is a block diagram illustrating an embodiment (4) of a packet processing device according to the present invention.
Figure 20:
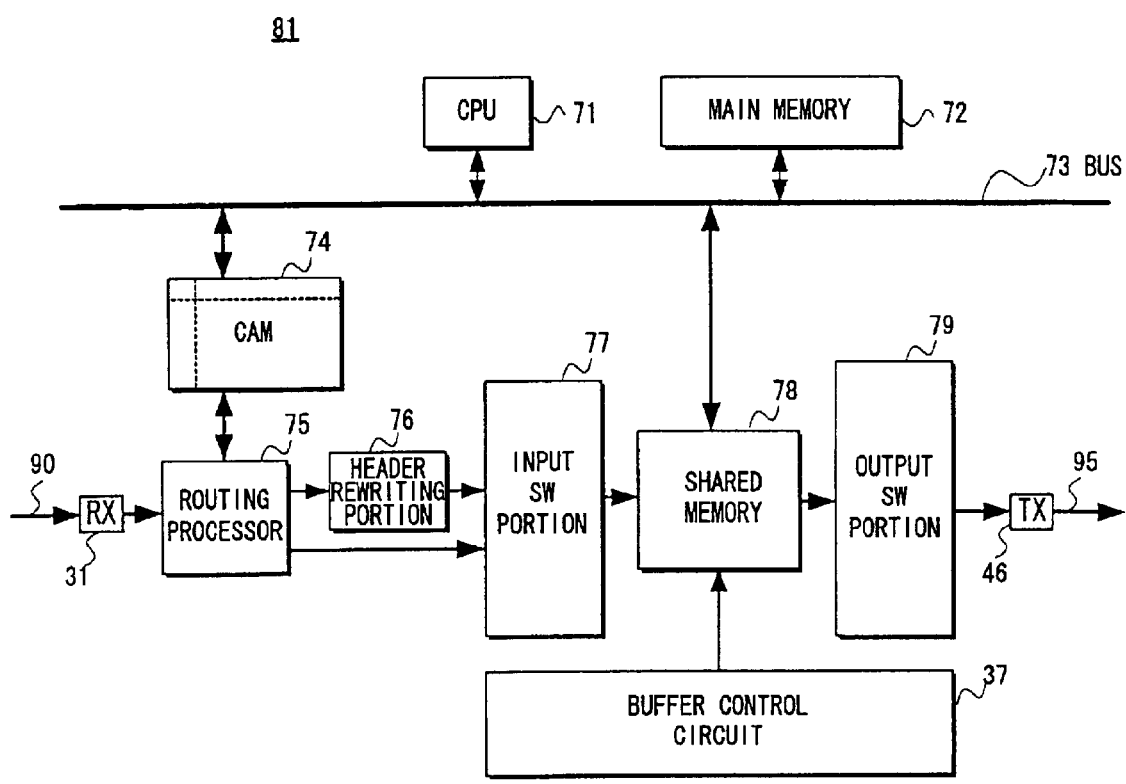
FIG. 20 is a block diagram illustrating a structure example of a prior art L3 switch.
Figure 21A:
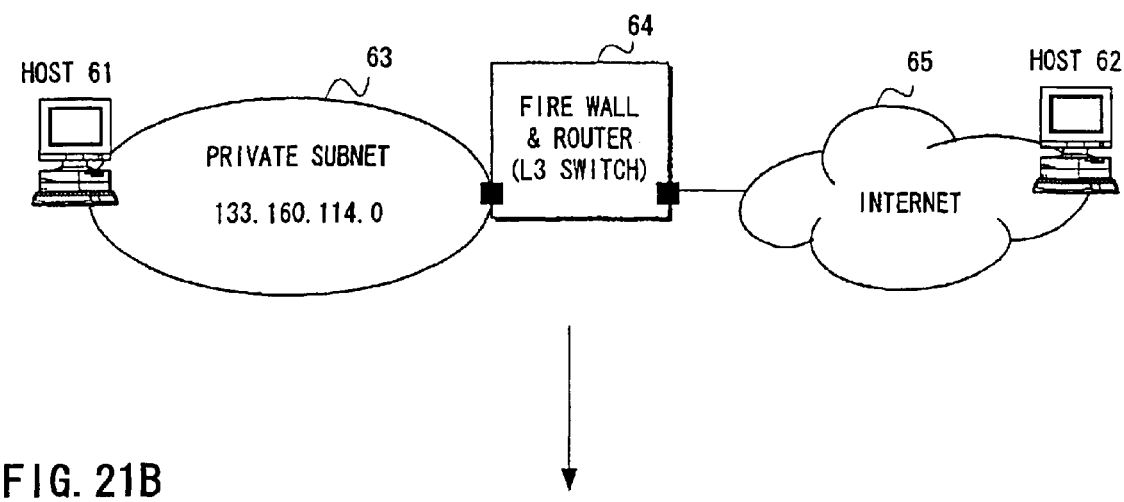
FIGS. 21A and 21B are block diagrams illustrating a prior art communication network using an L3 switch.
Figure 21B:
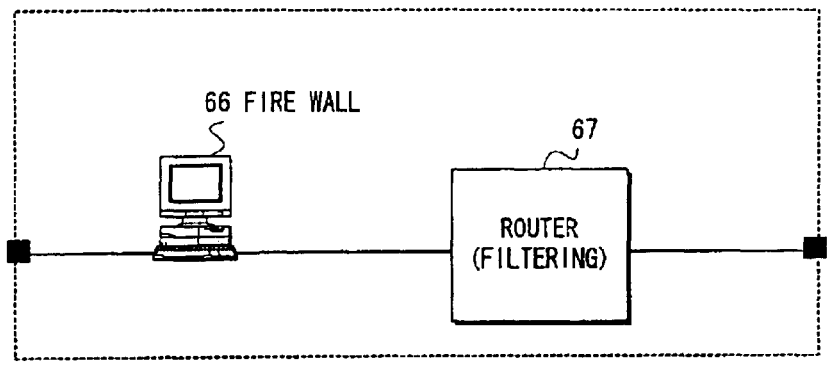

FIG. 10 shows an embodiment (4) of the packet processing device 10 according to the present invention. This packet processing device 10 is arranged such that an L3 switch 81 shown in FIG. 20 is provided in the interface module 30 of the packet processing device 10 of the embodiment (2) shown in FIG. 6.

In order to adopt this arrangement, the connection identifying circuit 32 inputs the receiving packet addressed to its own device from the routing processor 75, and the transmitting packets from the transmitting buffer 45 are outputted to the output SW portion 79.

Also, the reassembly buffer 36 and the transmitting buffer 45 of the packet processing device 10 are arranged in the shared memory 78 of the L3 switch 81. The receiving queue 40 and the transmitting queue 44 are arranged in the buffer control circuit 37.

It is to be noted that in FIG. 10, the OS kernel 20 and the application layer protocol processor 11 in the upper layer of the embodiment (2) are shown as the CPU 71 and the main memory 72 connected to the module 30 with the bus 73.

Figure 11:
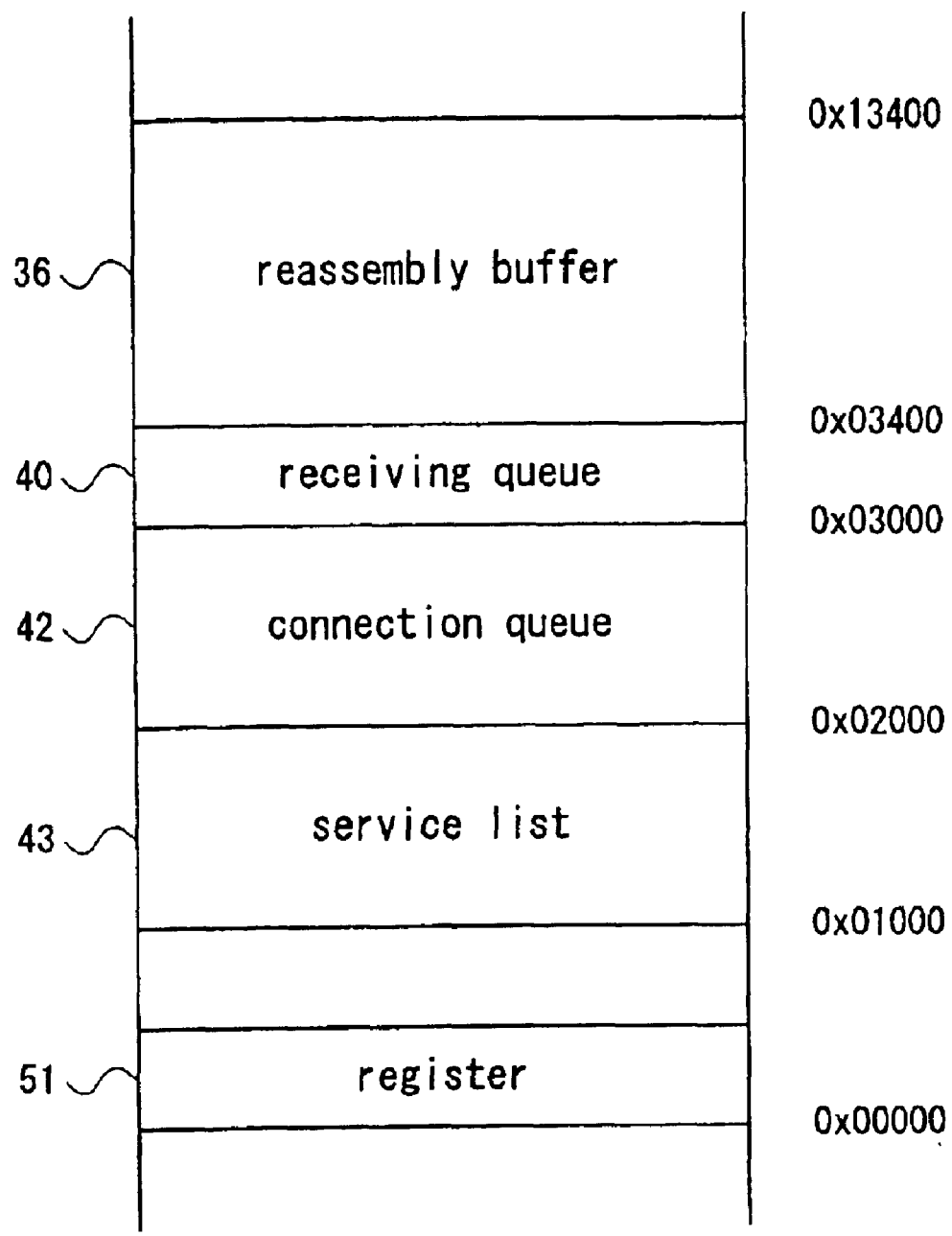
FIG. 11 is a memory map diagram illustrating tables used in a packet processing device according to the present invention.

FIG. 11 shows an example of a memory map of the L3 switch in the embodiment (4), wherein a register 51, the service list 43, the connection queue 42, the receiving queue 40, and the reassembly buffer 36 are respectively assigned to 0x00000–0x00fff, 0x01000–0x01fff, 0x02000–0x02fff, 0x03000–0x033ff, and 0x03400–0x133ff. It is to be noted that in FIG. 11, diagrams of the transmitting buffer 45 and the transmitting queue 44 are omitted for illustration purposes.

Figure 12:
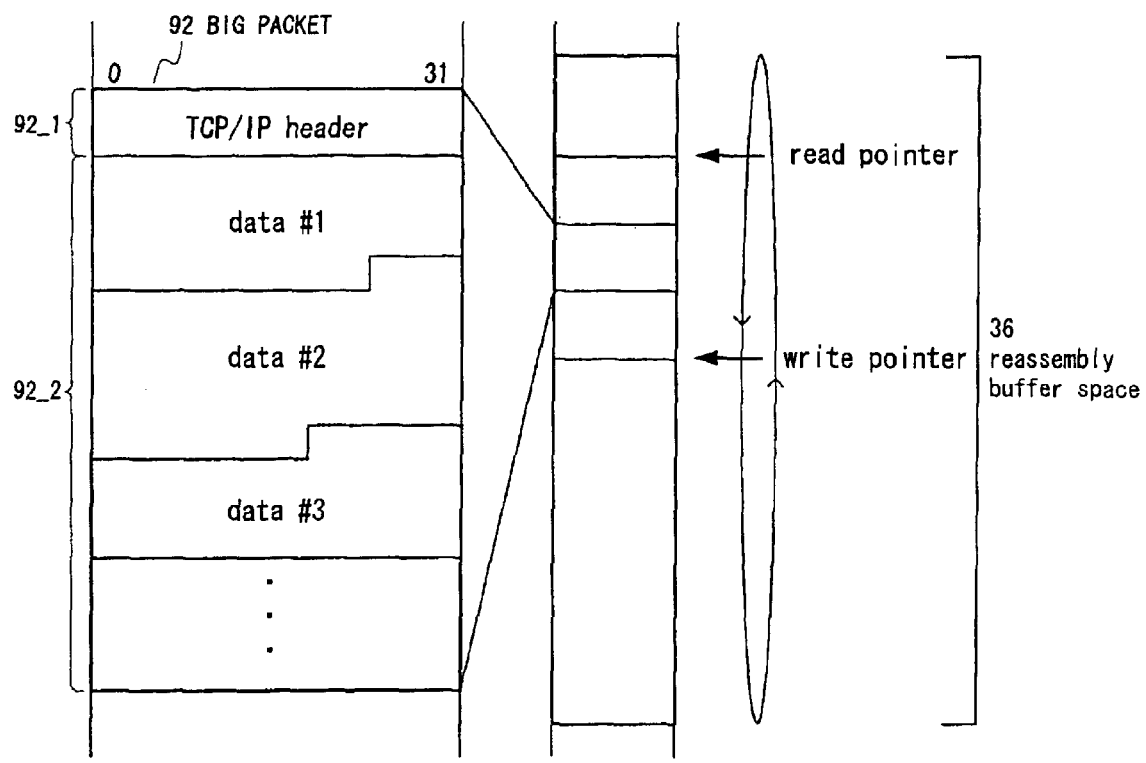
FIG. 12 is a format diagram illustrating a structure example of a reassembly buffer of a packet processing device according to the present invention.

FIG. 12 shows a structure example of the reassembly buffer wherein a read pointer for indicating an address to start the next reading and a write pointer for indicating an address to start the next writing are provided in this reassembly buffer (space) 36.

Also, the big packet 92 which is reassembled at the reassembly buffer 36 is composed of a header 92_1 and data 92_2. The header 92_1 is a combination of a TCP header and an IP header.

Figure 13:
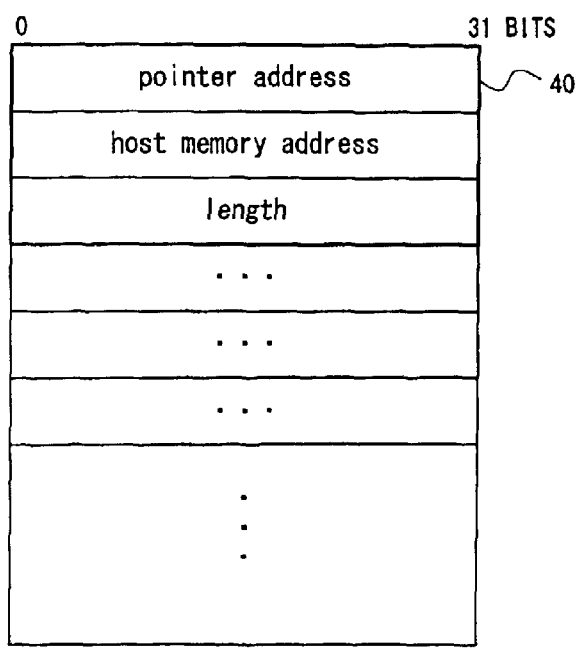
FIG. 13 is a format diagram illustrating a structure example of a receiving queue of a packet processing device according to the present invention.

FIG. 13 shows a format example of the receiving queue 40 which is composed of a pointer address, a host memory address, and a length of the big packet. It is to be noted that descriptions on the number of bits are omitted for illustration purposes. Hereinafter, the description on the connection queue 42, the service list 43, and the big packet 92 will be omitted likewise.

FIG. 14 shows a format example of the connection queue 42 wherein this connection queue 42 is composed of a source IP address, a destination IP address, a source port number, a destination port number, a reassemble start address of the big packet, a total length of the packet, and a packet number.

FIG. 15A shows a format example of an entry of the service list 43 wherein each of the entry is composed of a source IP address, a destination IP address, a source port number, a destination port number, a protocol, a buffer size (a maximum value of the receiving socket buffer), and a connection queue address, as connection information. This entry corresponds to the connection and is written in the service list 43 in the order of the establishment of the connection.

The number designating a protocol header type in the upper layer to be written in the IP header is written in the protocol field of the service list 43.

FIG. 15B shows the upper layer protocols and their numbers. In this embodiment (4), tcp="6" is written in the protocol field since the TCP protocol is used.

Figure 16A:
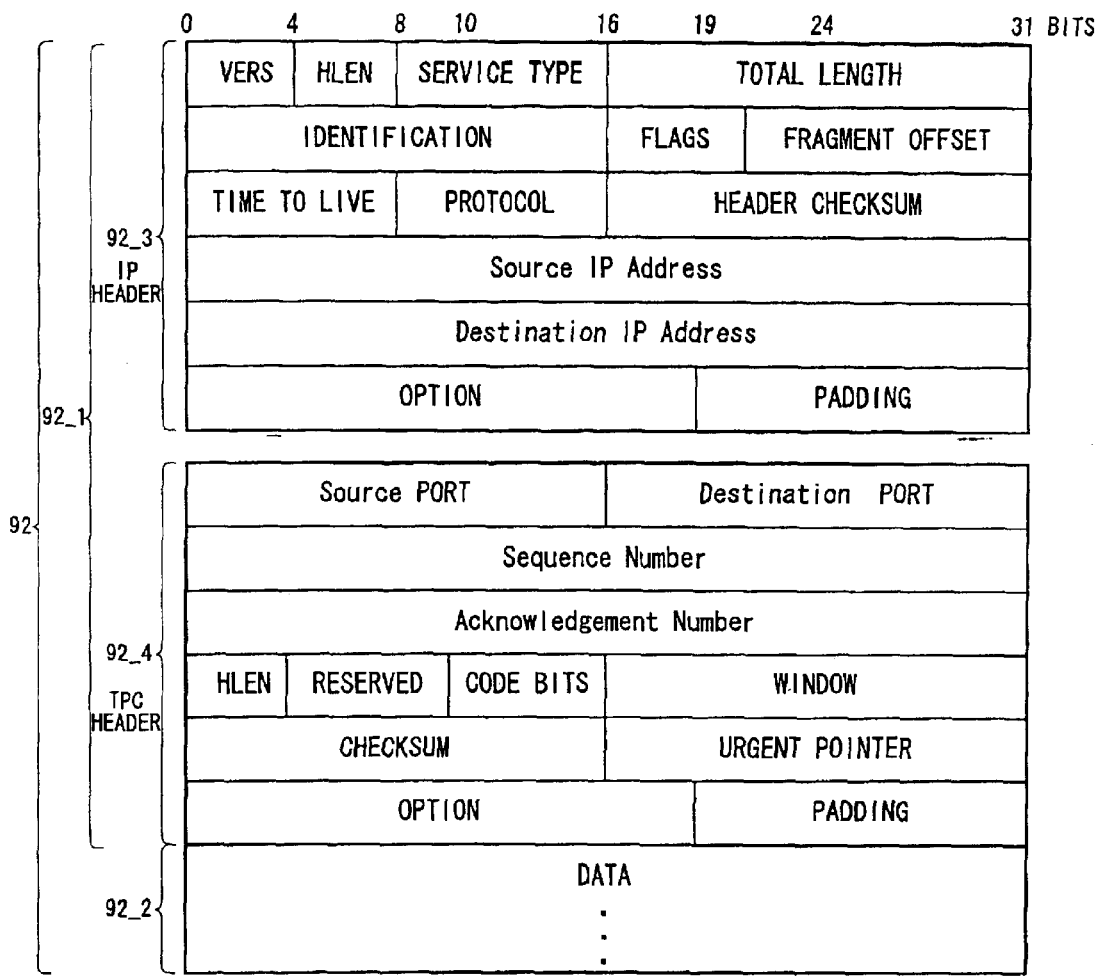
FIG. 16A is a format diagram illustrating a structure example of a header (TCP/IP) of a big packet of a packet processing device according to the present invention.

FIG. 16A shows a format example of the big packet 92. This big packet 92 is composed of a big packet header 92_1, which consists of an IP header 92_3 and a TCP header 92_4, and data 92_2.

Since the formats of the IP header 92_3 and the TCP header 92_4 are identical to the standard IP header and TCP header, their descriptions are hereby omitted.

Figure 16B:
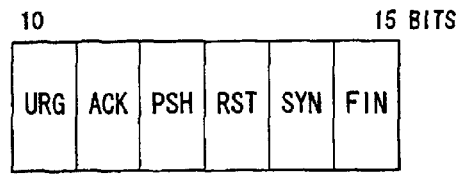
FIG. 16B is a format diagram illustrating a structure of a control flag portion of the TCP header 92_4 in FIG. 16A.

FIG. 16B shows a structure of a control flag portion of the TCP header 92_4 wherein this flag portion is composed of flags URG, ACK, PSH, RST, SYN, and FIN.

Figure 16C:
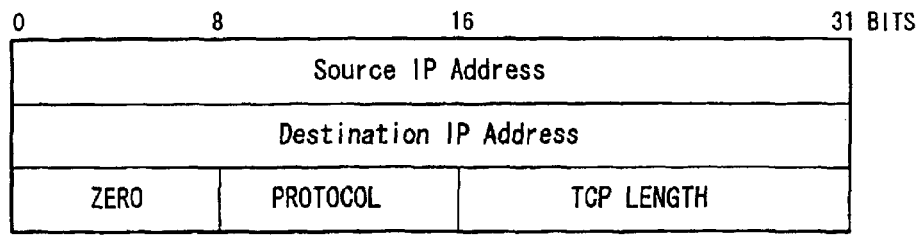
FIG. 16C is a format diagram illustrating a structure of a pseudo-header.

FIG. 16C shows a pseudo-header used in a checksum calculation which will be described later. This pseudo-header is composed of a source address, a destination address, a protocol type, a TCP length, and a field in which "0x00" is written.

Hereinafter, the operating procedures of the embodiment (4) will be described. It is to be noted that since the operating procedures of this embodiment are a combination of the embodiment (1) and the embodiment (2), a flow chart is hereby omitted.

Also, in this embodiment (4), the descriptions will be made by taking a fire wall as an example which performs a communication using both of the TCP and the IP protocols and by supposing the Ethernet as a physical network.

First of all, a connection is established between the source host and the fire wall.

The OS kernel 20 (see FIG. 6) in the upper layer of the server allocates the receiving buffer 22 which controls the TCP packet for each connection. The receiving buffer is called the receiving socket buffer and its maximum value is determined by a value set by the OS kernel 20. Also, in the OS kernel of the source host, a connection is established and the transmitting socket buffer, whose maximum value is determined by a value set by the OS kernel, is prepared.

The OS kernel 20 requests the driver 25 (see FIG. 6) to write in the interface module 30 the source IP address, the source port number, the destination IP address, the destination port number, the protocol number, and the receiving buffer size (free space) 93 which is the initial value of the receiving socket buffer, as the information of the newly established connection.

The driver 25 looks into the hardware register 51 (see FIG. 11), which is "servtop", to recognize the address of the service list 43 for writing the information so as to write the connection information 96 and the receiving buffer size 93 in the service list 43 (see FIG. 15A) of the interface module 30.

In the TCP protocol, when the data packet is received, the ACK packet including the sequence number and the current free space (window size) of the receiving buffer after receiving the data is transmitted to the interface module 30.

The interface module 30 collects information within the ACK packet to recognize a free space of the buffer in the upper layer to dynamically change the size of the big packet when assembling the big packet with the subsequent receiving packets from the source host.

Namely, in the interface module 30, the ACK packet transmitted from the OS kernel 20 is sent to the connection identifying circuit 47 through the DMA transfer circuit 41 and the transmitting buffer 45.

In case the connection identifying circuit 47 detects that the connection information of the service list 43 and the connection information (the source IP address, the destination IP address, the source port number, the destination port number, and the like) of the packet are mutually coincident, it is hereby confirmed that the packet is the TCP packet to be sent out from its own device. Then, in order to check that it is the ACK packet, the tenth word from the beginning of the IP header (see FIGS. 16A and 16B) is read to determine whether or not an eleventh bit ACK flag="1". When the ACK flag="1", the same operating procedures as those shown in FIG. 7 are performed.

Namely, the window size extracting circuit 48 extracts the window size from a window field of bits 16–31, the receiving buffer length calculating circuit 49 calculates the receiving buffer length (free space) 93 from the window size, and the receiving buffer length writing circuit 50 writes the calculation result in a buffer size field of the service list 43.

On the other hand, when the interface module 30 receives the receiving packet 90 from the source host through the receiving interface 31, the routing processor 76 determines whether or not it is he IP packet addressed to its own device and sends the packet addressed thereto to the connection identifying circuit 32.

The connection identifying circuit 32 compares the protocol umber in bits 9–15 of the third word of the TCP/IP header, the source and destination IP addresses of the fourth and fifth words, and the source port number and the destination port number of the seventh word with the corresponding data in the service list 43 for identifying whether or not it is the packet of the connection to be managed.

If it is the case and if "1" is set in any of the flags URG, ACK, PSH, RST, SYN, and FIN in bits 10–15 of the tenth word, the packet is directly written in the receiving queue 40 without any accumulation in the reassembly buffer 36 because of a packet which is expected to reach the upper layer immediately.

For the packet with the flag "0", steps S13–S27 in the operating procedures shown in FIG. 5 are executed and the packet is written in the receiving buffer of the upper layer after being sent to the reassembly buffer 36 for each connection to be assembled into a big packet.

Namely, the checksum calculating circuit 33 makes the pseudo-header shown in FIG. 16C and reads the pseudo-header, the TCP header, and the data portion to calculate the TCP checksum to be compared with the checksum of the bits 0–15 in the fifth word of the TCP header. If they are not coincident, the packet is discarded as not being the normal packet and the big packet accumulated heretofore in the reassembly buffer 36 is queued in the receiving queue 40.

If they are coincident, the packet is regarded as being the normal packet so that the reassembly buffer writing circuit 35 writes the data in the reassembly buffer 36 and simultaneously writes the buffer size and the number of packets in the packet total length field and the packet number field of the connection queue 42, respectively.

Then, it requests the buffer control circuit 37 to designate the address to write the packet and notifies the buffer condition determining circuit 38 that the packet has been written.

The buffer condition determining circuit 38 compares the total length field with the buffer size field of the service list 43, queues the big packet in the receiving queue 40 if the total size exceeds the buffer size, and interrupts the OS kernel 20.

As shown in FIG. 12, the reassembly buffer 36 buffers the big packet 92 for each connection. The reassembly buffer 36 is so arranged that a ring-like overlap is enabled by the buffer control circuit 37, and is managed by the read pointer indicating the address which is already read and the write pointer indicating the address which is already written.

The buffer control circuit 37 outputs a write starting address upon receiving the request of the buffer writing circuit 35. The buffer control circuit 37 modifies the write pointer after allocating a buffer domain of 64K bytes for the reassembly buffer of a single connection. If the write pointer overlaps and exceeds the read pointer, the address of "0x0" is outputted as an error.

In case the address has been obtained from the buffer control circuit 37, the reassembly buffer writing circuit 35 writes the starting position of the big packet in the reassemble start address of the connection queue 42 (see FIG. 14) and writes the packet to the designated start address in the reassembly buffer 36.

It is to be noted that the header deleting circuit 34 looks into the packet number of the connection queue 42 and determines that if it is "0", the receiving packet is to be transferred to the reassembly buffer writing circuit 35 including the TCP/IP header while if the packet number is equal to or more than "1", determining that the receiving paket is the second or the subsequent packet so that only the data portion is transferred to the reassembly buffer writing circuit 35 without the header portion.

Also, the reassembly buffer writing circuit 35 sets the timer 39 to time out after a fixed period of time when it puts the first packet in the reassembly buffer 36. Thereafter, the packet number in the connection queue 42 is counted up by "1" every time the packet is written in the reassembly buffer 36.

When the second or the subsequent packet is written in the reassembly buffer 36, a "data length" calculated from the total length of the packet and the header length written in the header of the IP packets to be deleted and the "sequence number" in the TCP header are read.

Then, the "data length" is added to the "packet total length" in the IP header which is written in the reassembly buffer with the first packet and the "sequence number" in the TCP header is modified by the former "sequence number". Moreover, the entry of the packet total length in the connection queue 42 is rewritten by the "packet total length" which is the result of the addition.

Afterwards, the buffer condition determining circuit 38 compares the "packet total length" of the connection queue 42 with the "buffer size (free space)" in the service list 43, queues the big packet in the receiving queue 40, and interrupts the CPU 71 if the "packet total length" exceeds the "buffer size".

In the receiving queue 40 (see FIG. 13), the packet starting position (the reassemble start address of the connection queue 42) in the reassembly buffer 36 is written as pointer address.

Thereafter, the big packet is transmitted to the receiving socket buffer through the DMA transfer circuit 41 according to the queuing order in the receiving queue 40.

If the second or the subsequent data packet does not arrive early and the size of the big packet do not exceed the buffer size, the timer 39 times out when the fixed period of time elapses, which is notified to the buffer condition determining circuit 38. The buffer condition determining circuit 38 writes in the receiving queue 40 the data starting address in the reassembly buffer 36 and dequeues the queue of the corresponding connection of the connection queue 42 even if the buffer size is not attained. As for the OS, an interrupt is issued for notifying that the big packet has been received.

Upon receiving the interrupt from the interface module 30, the driver 25 of the OS kernel 20 acquires a control buffer wherein an mbuf or the like seen in the BSD UNIX OS system is hereby assumed in a main memory which is managed by the OS kernel 20. By obtaining the address in which the data should be copied (see FIG. 6), the driver 25 writes the data in the host memory address within the receiving queue 40.

The DMA transfer circuit 41 starts the DMA transfer and transmits data of the big packet length from the pointer address indicated by the receiving queue 40 to the host memory address.

The OS kernel 20 performs the ordinary protocol processing regarding the mbuf including the received big packet as a single packet. Although the big packet is once received at the TCP socket buffer, as above-mentioned, since the data size of the received big packet satisfies the conditions of the receiving socket buffer for sending out the ACK packet, the ACK packet is prepared immediately to be transmitted to the source host through the interface module 30 and the big packet is transferred to the application buffer.

As mentioned above, the buffer size of the service list 43 shown in FIG. 15 is dynamically changed based on the data of the window size field in the ACK packet returned from the TCP protocol of the OS kernel 20.

Hereinafter, procedures for calculating the buffer size based on the data of the window field will be described referring to FIGS. 17A–17C.

Figure 17A:
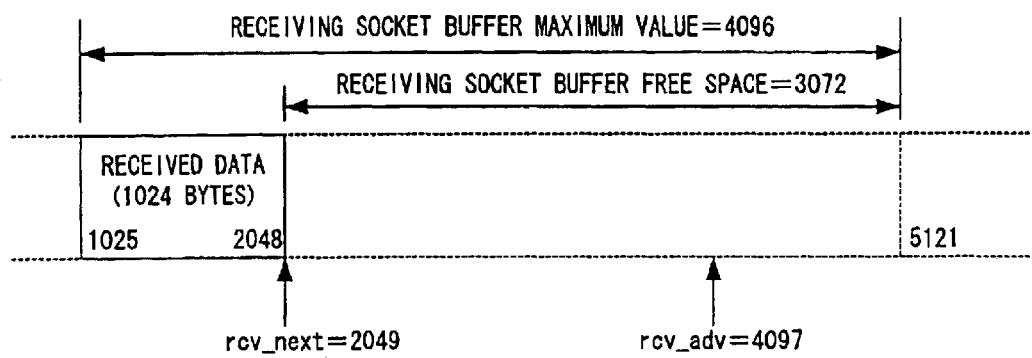
FIGS. 17A–17C are diagrams illustrating a transmission timing of an ACK packet of a TCP protocol.
Figure 17B:
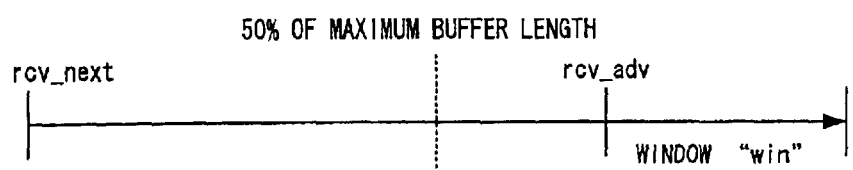
Figure 17C:

As shown in FIG. 17A, the TCP protocol in the OS kernel 20 manages the receiving socket buffer with two pointers, i.e. a rcv_adv and a rcv_next.

The rcv_adv pointer is a sequence number which is already notified to the transmission side TCP using the ACK packet that the receiving side socket buffer is ready to receive while the rcv_next pointer shows a value in which the sequence number received from the transmitting side TCP plus "1", namely the starting position for receiving the subsequent data.

The TCP protocol calculates a window "win"=(maximum socket buffer length)−{(rcv_adv pointer indicating address)−(rcv_next pointer indicating address)} for every packet reception transmits the ACK packet which has the window "win" supposed as the window size when the window "win" is equal to or more than 50% of the maximum buffer length or when the window "win" satisfies the condition that two portions of the maximum segment can be included in that size.

According to this condition, the ACK packet is transmitted whenever receiving data of at least a half of the maximum buffer length.

The packets are converted into a big packet to have a size satisfying the ACK packet transmission condition so that the ACK packet is issued whenever the packets reassembled to a big packet at the interface module 30 are transferred to the OS kernel 20.

This purpose is to immediately copy the big packet to the application buffer without being accumulated again at the receiving socket buffer in the OS.

This is achieved by the following methods. If the window "win" is smaller than a half of the maximum buffer size as shown in FIG. 17B, at least the ACK packet is returned upon receiving data of {(maximum buffer size)–(window "win")}. Also, if the window "win" is larger than a half of the maximum buffer size as shown in FIG. 17C, the ACK packet is returned upon receiving data as much as the half of the maximum buffer length.

Then, a data size M for accumulation in the reassembly buffer to be assembled to the big packet is determined by the following Eq.(1).

Data size $M$=MAX[(maximum buffer length-window "win"), (maximum buffer length/2)] Eq. (1)

The receiving buffer length calculating circuit 49 calculates this data size M and the receiving buffer length writing circuit 50 writes it in the buffer size field of the service list 43.

Also, generally in the TCP protocol, in case a backward data packet is to be transmitted to the source host, while pending the transmission of the acknowledgement for a fixed time (delayed ACK packet) after the data packet is received in the socket buffer, the acknowledgement is made without waiting for the time out of the delayed ACK timer by transmitting this data packet in which the acknowledgement flag is set. It is undesirable to have the packet accumulated in the reassembly buffer 36 since the acknowledgement is ready to be transmitted, as described above the backward data are flowing.

Therefore, if queuing the backward data packet in the transmitting queue 44 is acknowledged by the connection identifying circuit 47, the receiving buffer length writing circuit 50 notifies the timer 39 to enforce the time out concerning the connection.

As a result, after the data packets accumulated heretofore in the reassembly buffer 36 are assembled to the big packet, the buffer condition determining circuit 38 writes the data starting address of the reassembly buffer 36, which is previously written in the connection queue, in the receiving queue 40 and dequeues the corresponding connection of the connection queue 42. Also, it issues an interrupt for notifying the OS kernel 20 that the big packet has been received.

Also, in case the connection is disconnected upon reception of any of FIN and RST packets with RST and FIN flags respectively set as shown in FIG. 16B from the source host, the OS kernel 20 accesses the service list 43 through the driver 25 to delete the corresponding connection.

Since the deletion is not necessarily done from the end of the list, after the process of shifting above each of the entries following the corresponding entry, a hardware register (servtop) indicating a new writing position of the service list 43 is updated.

As a result, the number of packets to be transferred to the OS kernel 20, that is the number of interrupts is reduced, so that the reduction of the protocol processing in the OS kernel 20 and the reduction of the overhead for the interrupt processing enables the processing within the OS to be sped up.

Also, by accessing the hardware resource of the interface module 30 from the OS kernel 20, it is made possible to avoid the disturbance of the hardware L3 forwarding process.

Also, according to the present invention, a high-speed processing of the traffic through the application is enabled without changes in the application since the OS and the interface (API) of the application are untouched.

Also, the present invention enables a high-speed processing of even the Proxy function by running not only the fire wall function but also a Proxy server function on the L3 switch.

Figure 18:
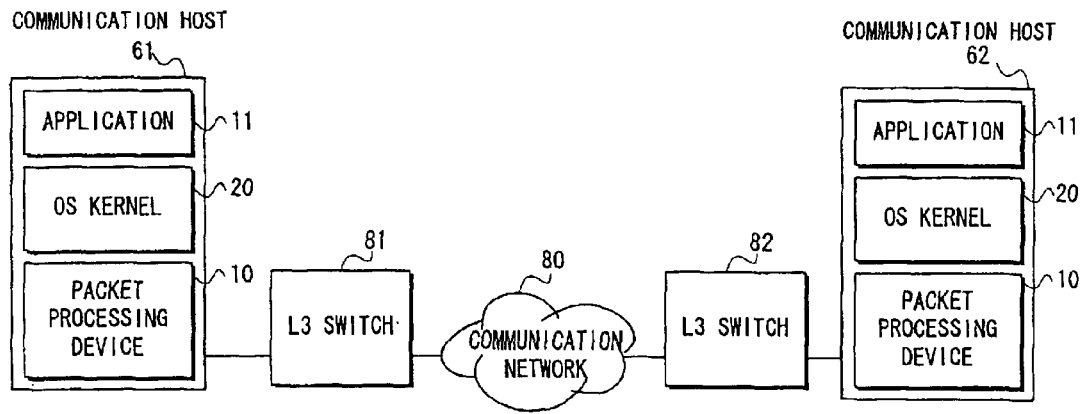
FIG. 18 is a block diagram illustrating an embodiment (5) of a packet processing device according to the present invention
Figure 19:
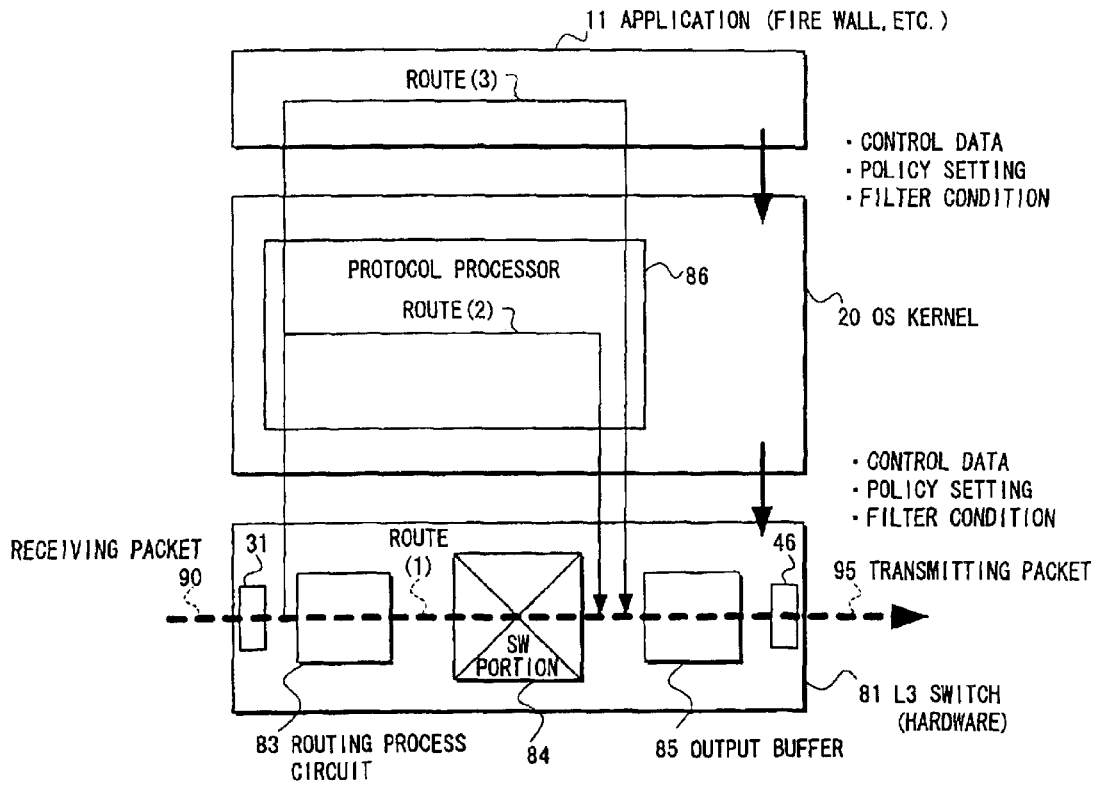
FIG. 19 is a block diagram illustrating a prior art packet processing device using L3 switches.

FIG. 18 shows an example of communication wherein the NIC devices including the packet processing device which is the embodiment (5) of the present invention are equipped to communication hosts 61 and 62.

Namely, it is possible to apply the packet processing device of the present invention to the network interface card (NIC device) in the communication hosts 61 and 62.

In FIG. 18, the communication host 61 is connected to the communication host 62 through an L3 switch 81, a communication network 80, and an L3 switch 82.

Each of the communication hosts 61 and 62 is composed of the application 11, the OS kernel 20, and the NIC device (not shown) including the packet processor 10.

Hereinafter, communicating operations between the communication host 61 and the communication host 62 will be described.

(1) The communication host 61 establishes a connection with the communication host 62 by using the TCP/IP protocol.

(2) When the connection is established, the communication host 61 transmits the packet to the communication network 80 through the L3 switch 81 according to the TCP/IP protocol.

(3) The communication host 62 accumulates the receiving packet in the reassembly buffer provided in the NIC when the packet is received at the NIC device by the procedure similar to the embodiment (1).

(4) When the reassembly buffer attains the receiving buffer size of the TCP protocol which changes dynamically in the communication host 62, it reassembles the packets in the reassembly buffer into a single IP packet to be assigned to the OS kernel 20 by an interrupt. The checksum calculating circuit is necessary for this reassembling.

(5) The OS kernel 20 performs the IP protocol processing and the TCP protocol processing for the received packet. Generally, the TCP protocol processing performs the accumulation of the packets at the TCP receiving buffer in the OS kernel 20.

When a fixed size of packets is accumulated in the TCP receiving buffer, the accumulated packets are copied to the application which is located above the OS.

According to the present invention, the reassembled IP packet which is received from the NIC device is reassembled to have the same size with the TCP receiving buffer so that it is immediately copied to the application upon entering the receiving buffer.

As a result, it is possible to reduce the overhead of the interrupt processing in the OS by reducing the interrupt from the NIC device to the OS and to reduce the possibility of blocking the packet reception of the hardware by having the packets which are copied from the NIC device to the OS enlarged in size but assembled into a single packet.

Also, it is possible for the TCP processing in the OS to reduce the overhead by having the number of the IP header processing be only once although it being originally required to be plural times.

As described above, a packet processing device according to the present invention is arranged such that a first means notifies a free space of a receiving buffer, a third means determines a size of a big packet based on the free space, and a second means reassembles plural receiving packets into a single big packet so that reducing the number of packets arriving at the receiving buffer of an upper layer is made possible thereby reducing the number of times of processing required for the packet transmission in the communication protocol. Therefore, it is made possible to transmit packets at a high speed and to reduce the overhead such as the context switching or the like which is made at the time of interrupt, thereby enabling the reduction of the number of times of the packet processing in the upper layer.

Also, by arranging that an L3 switch having a packet forwarding function in a network layer by a hardware logic transmits plural receiving packets addressed to its own device to the second means, it is made possible to reduce the blocking caused by the OS kernel's access such as memory copy or the like, to the buffer memory which is used for a hardware packet forwarding processing of the L3 switch, thereby enabling a high-speed data forwarding.

Moreover, by arranging that an NIC device includes the packet processing device to transmit plural receiving packets addressed to its own device to the second means, it is made possible for the OS in the upper layer of the NIC device to reduce the number of processing the receiving packet addressed to its own device, thereby eliminating the overhead of the OS.

What we claim is:

1. A packet processing device for processing a layered communication protocol comprising:

a receiving buffer of an upper layer, first means notifying a free space of the receiving buffer, second means reassembling a plurality of receiving packets into a single big packet, based on the free space, to be transmitted to the receiving buffer, and third means determining a size of the big packet based on the free space.

2. The packet processing device as claimed in claim 1 wherein the first means is included in the upper layer and notifies the free space to the third means.

3. The packet processing device as claimed in claim 1 wherein the first means comprises a backward packet inclusive information reading circuit detecting the free space based on information within a backward packet from the upper layer.

4. The packet processing device as claimed in claim 2 wherein the upper layer comprises a transport layer.

5. The packet processing device as claimed in claim 2 wherein the upper layer comprises an application layer and the big packet is transmitted not through a buffer of a transport layer but directly to the receiving buffer.

6. The packet processing device as claimed in claim 1, further comprising a connection identifying circuit identifying a connection of the receiving packets, the second means reassembling the big packet for each connection based on identification information of the identifying circuit.

7. The packet processing device as claimed in claim 1, further comprising a checksum calculating circuit adding a checksum to the big packet.

8. The packet processing device as claimed in claim 1 wherein the third means has a timer for giving the second means instructions for transmitting the big packet to the receiving buffer when a predetermined time elapses.

9. The packet processing device as claimed in claim 1 wherein the third means gives the second means instructions for assigning the big packet to the receiving buffer at a time when the big packet attains a size for issuance of an acknowledgement packet from the upper layer.

10. The packet processing device as claimed in claim 1 wherein the second means assembles the big packet with a first receiving packet including a header and subsequently received packets whose headers are deleted.

11. The packet processing device as claimed in claim 1, further comprising means immediately transmitting the receiving packet to the receiving buffer without storing the receiving packet in the second means when the receiving packet is a non-accumulation packet.

12. The packet processing device as claimed in claim 1, further comprising an L3 switch which has a packet transfer function in a network layer made in a hardware form and transmits a plurality of receiving packets addressed to itself to the second means.

13. An NIC device comprising the packet processing device according to claim 1 which transmits a plurality of receiving packets addressed to itself to the second means.

* * * * *